United States Patent [19]

Freidel et al.

[11] Patent Number: 4,830,649
[45] Date of Patent: May 16, 1989

[54] METHOD & APPARATUS FOR BENDING GLASS SHEETS

[75] Inventors: Kenneth L. Freidel, Cherry Hill; William G. Freund, Burlington, both of N.J.

[73] Assignee: Hordis Brothers Capital Company, Pennsauken, N.J.

[21] Appl. No.: 190,899

[22] Filed: May 6, 1988

[51] Int. Cl.⁴ .......................................... C03B 23/025
[52] U.S. Cl. ...................................... 65/104; 65/106; 65/107; 65/273; 65/287
[58] Field of Search ................. 65/104, 106, 107, 287, 65/273, 289

[56] References Cited

U.S. PATENT DOCUMENTS

| | | | |
|---|---|---|---|
| 2,223,124 | 11/1940 | Owen | 65/273 X |
| 3,600,150 | 8/1971 | Rougeux | 65/287 X |
| 4,368,065 | 1/1983 | Frank | 65/273 X |
| 4,447,252 | 5/1984 | Nocco et al. | 65/287 X |
| 4,540,425 | 10/1985 | Bocelli et al. | 65/107 X |

Primary Examiner—Arthur Kellogg
Attorney, Agent, or Firm—John F. A. Earley; John F. A. Earley III; P. Michael Walker

[57] ABSTRACT

An apparatus and method for bending glass sheets. In a first embodiment a heated glass sheet is moved into a bending section by rollers which are retracted to drop the heated glass sheet onto a mold where the glass sheet sags into a desired bent shape, then quenched between quench heads and lifted off the bending mold up to the upper quench head by air pressure, the rollers then close beneath the glass sheet and the glass sheet is deposited onto the rollers for conveying to a cooling station. In a second embodiment, the hot bent glass sheet is transferred on a mold from a bending section by a first shuttle to a position between the quench heads for quenching then removed from the mold by blowing air through the lower quench head until the glass sheet contacts an upper second shuttle which is transported to a blow-up section where the sheet is lowered onto a roller conveyor to a cooling section. In a third embodiment, the heated bent glass sheet is transferred on a mold by a shuttle between quench heads for quenching and then transferred to a blow-up section where the glass sheet is lifted against a cooling head while a shifting roll conveyor is moved underneath to receive and convey the glass to a cooling section.

32 Claims, 27 Drawing Sheets

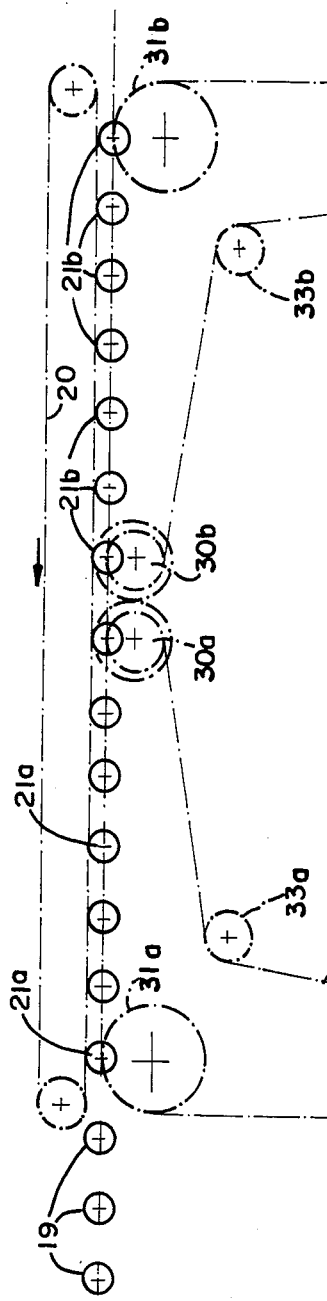
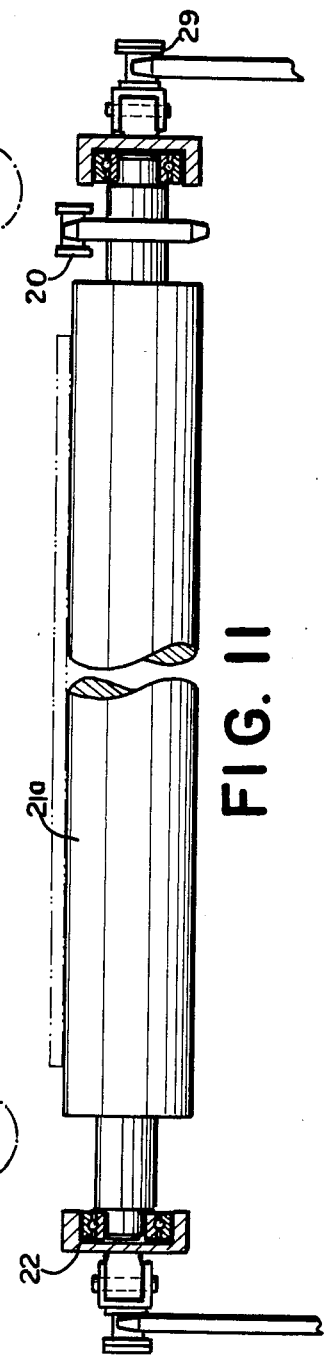

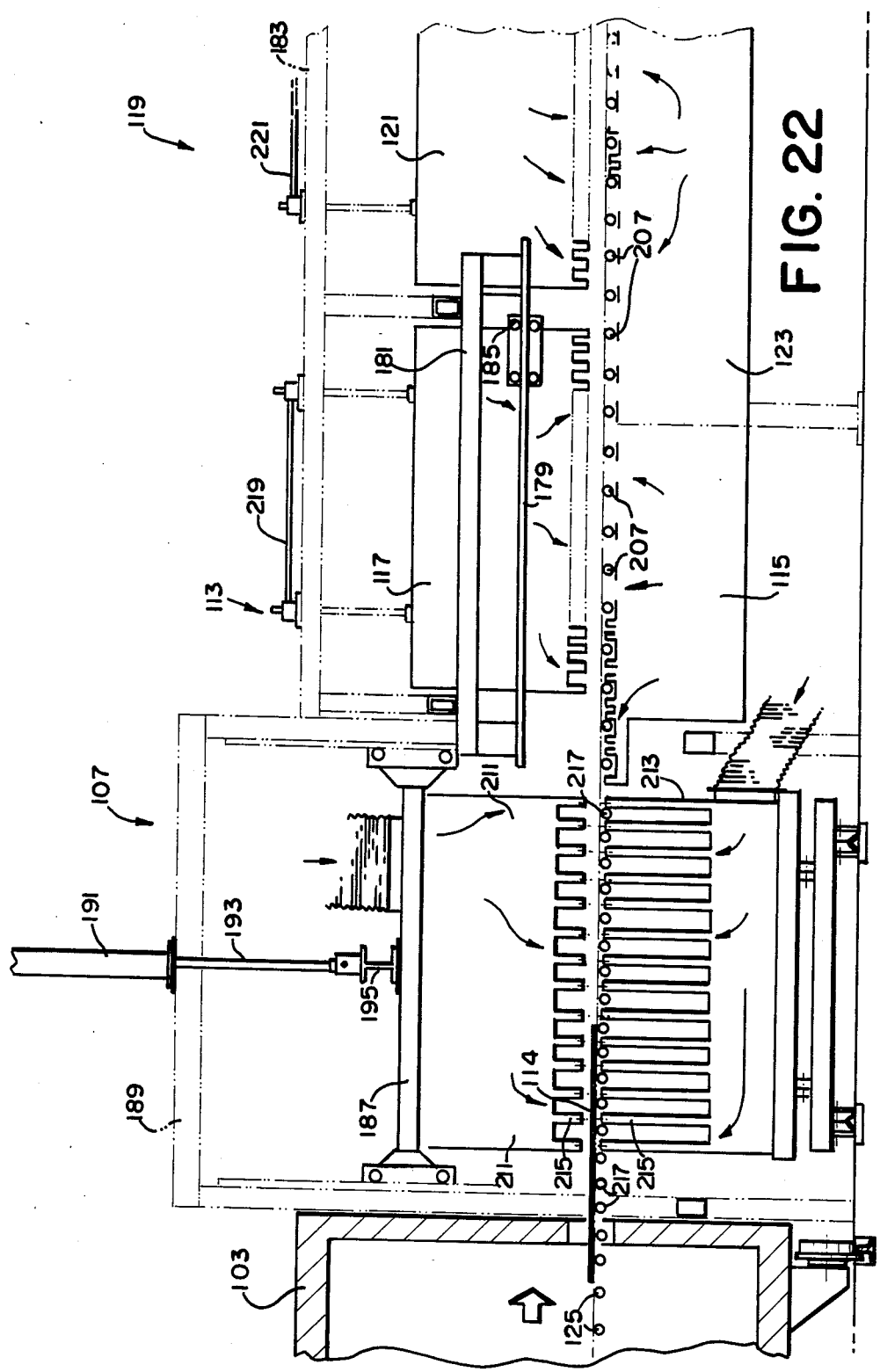

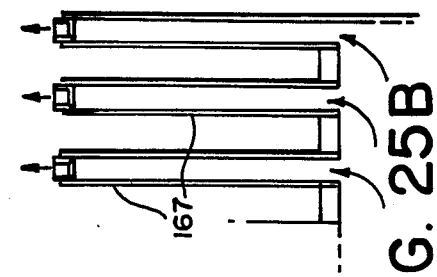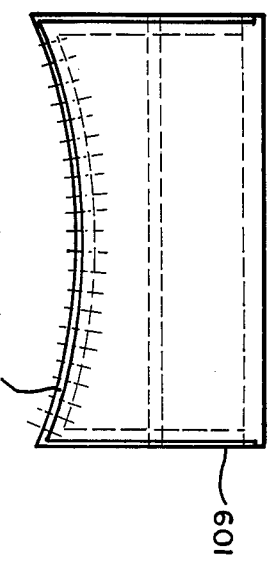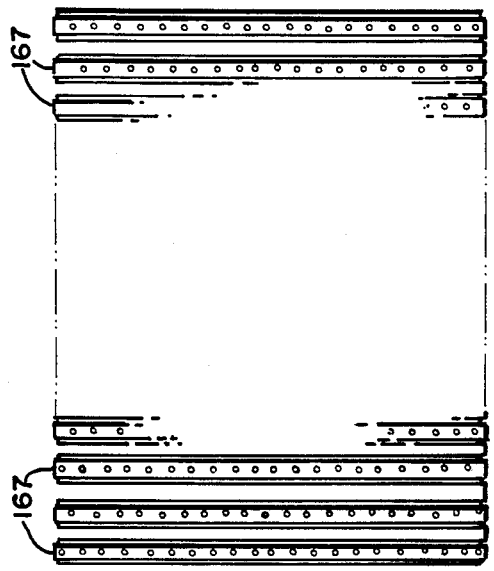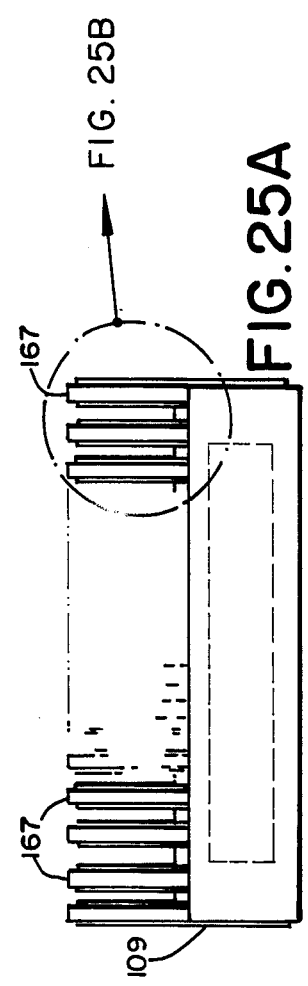

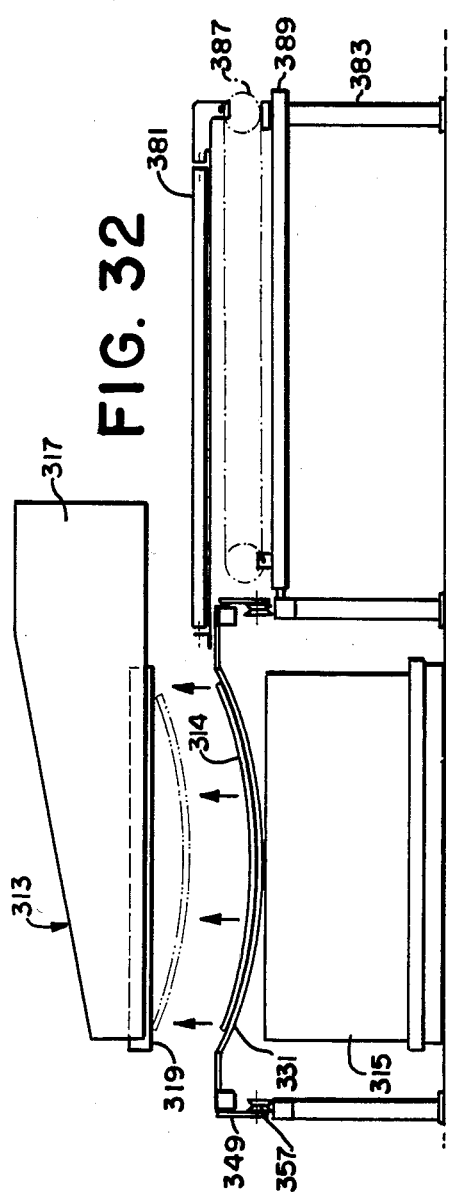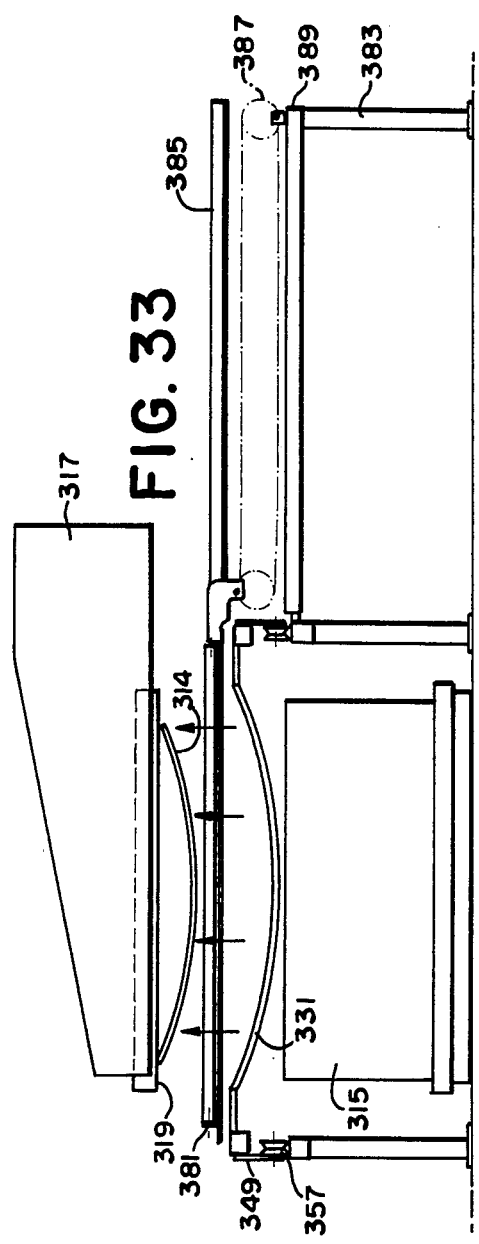

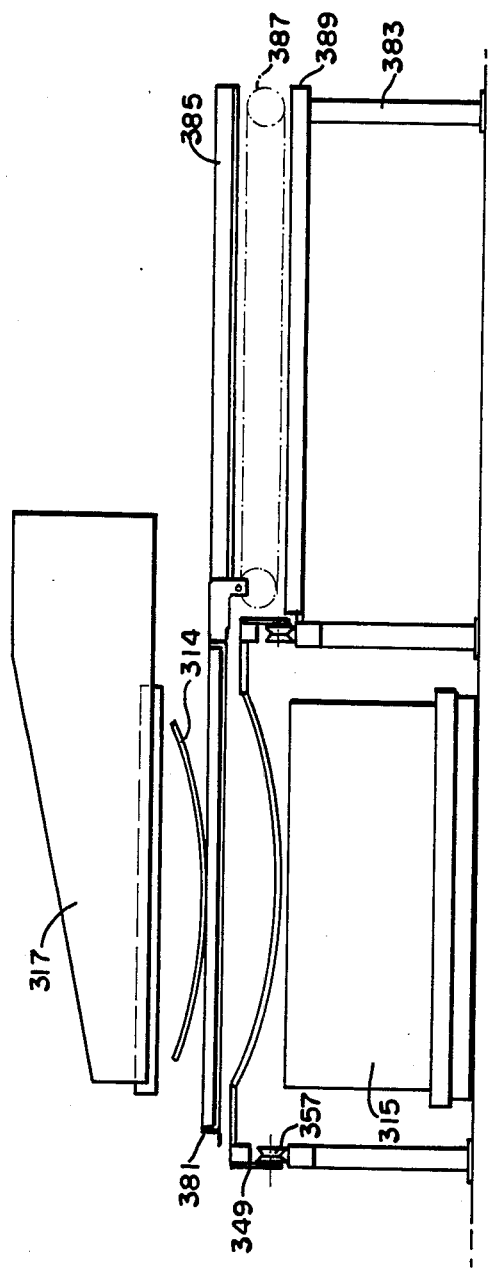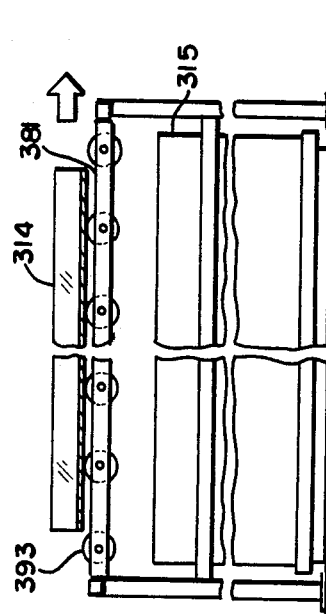

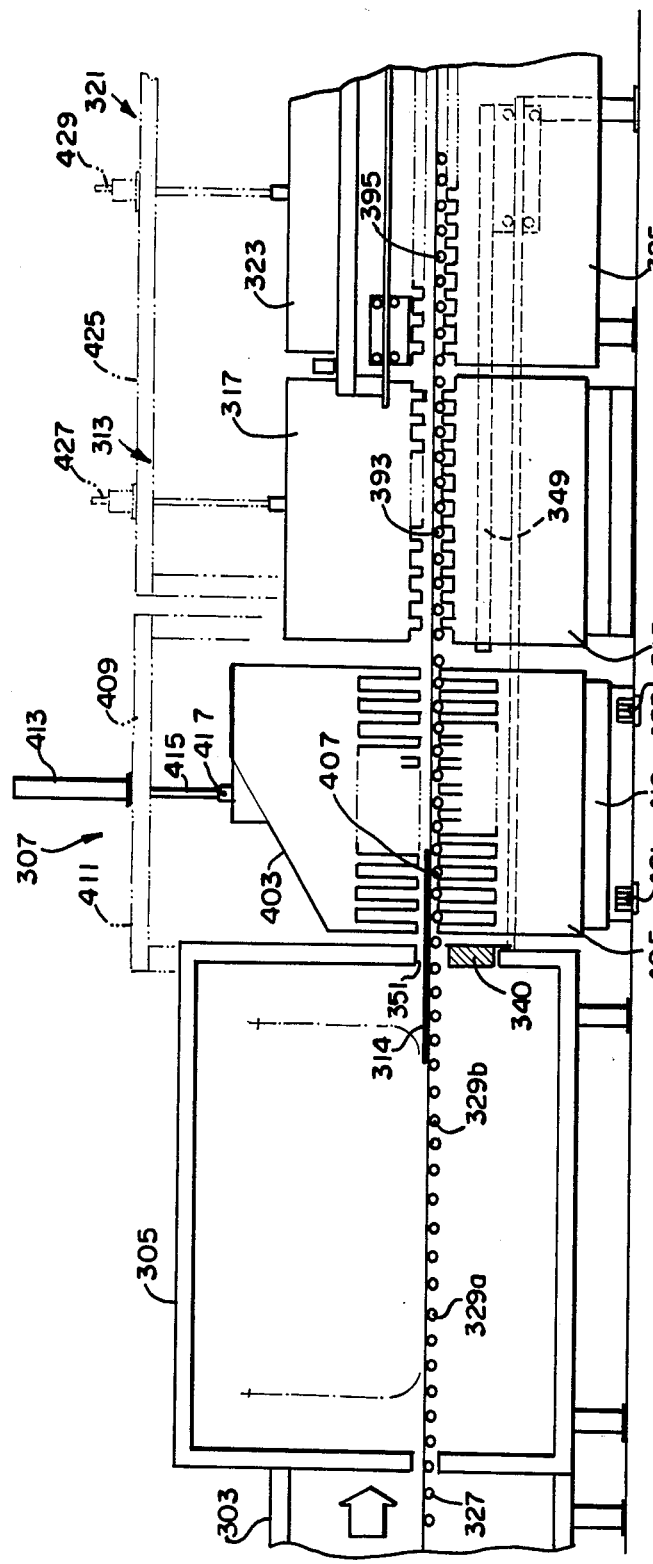

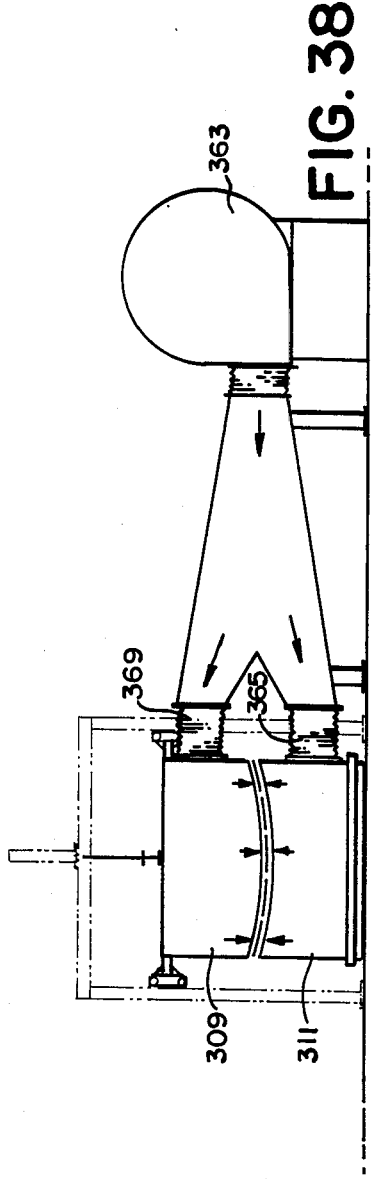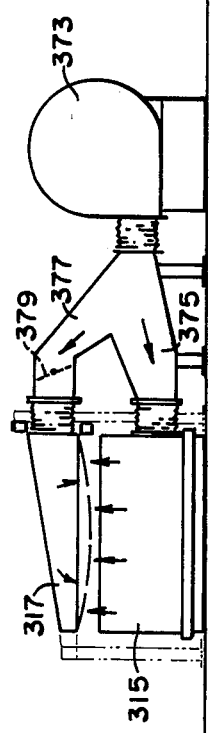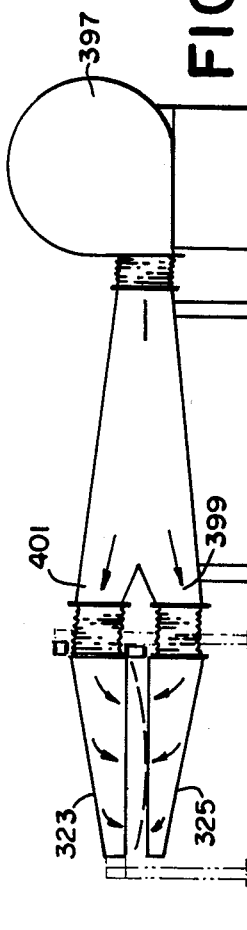

METHOD & APPARATUS FOR BENDING GLASS SHEETS

BACKGROUND OF THE INVENTION

1. Field of the Invention

This invention relates to an apparatus and a method for bending and tempering glass sheets, and more particularly concerns bending glass sheets by dropping a heated glass sheet to a bending mold where the glass sags or bends by gravity to conform to the shape of the mold.

2. Description of the Prior Art

Many technques for bending glass sheets are known. A simple technique is to heat a sheet of glass while supporting the glass sheet on a contoured mold to permit the glass sheet to sag to conform to the shape of the mold. This process is slow, but can be speeded-up by applying a mechanical bending force such as by pressing the glass between a pair of contoured molds, as disclosed by Seymour in U.S. Pat. No. 3,846,104.

U.S Pat. No. 3,476,540 to Ritter et al. discloses a glass bending arrangement whereby a single vertically-rising lower bending mold effects the bending of the glass through the inertia of the glass. Disadvantageously, the bent glass sheets must pass without edge support along a roller conveyor into a tempering zone.

U.S. Pat. No. 3,600,150 to Rougeux shows a glass bending arrangement where the heat softened glass sheet is slipped from a roller conveyor onto a flexible hammock and thereafter press-bent between upper and lower forming molds. The purpose of the flexible hammock is to support the glass sheet initially out of contact with the rigid shaping mold surfaces. It is apparent that a major reconstruction of the apparatus would be required when a change in the glass shape is desired.

U.S. Pat. No, 4,300,935 to Seymour discloses a glass bending arrangement wherein a heat softened glass sheet is elevated by a flat vacuum platen that raises the glass sheet to an elevated position and drops the glass sheet onto a bending mold to effect the bending. The bending mold is passed into a tempering station by a shuttle where the glass sheet is tempered.

A problem with prior art glass bending systems has been to provide a system that can be easily adapted to bend different shapes and sizes of glass.

Another problem with the prior art glass bending systems is the heated glass sheets begin to cool as soon as they leave the oven before they are bent, which can affect the quality of the glass bending.

SUMMARY OF THE INVENTION

In a first embodiment of the present invention a heat softened glass sheet is transferred from an oven to a forming station where it is dropped by pull-out rollers onto a contoured bending mold where the glass sag-bends by gravity to conform to the shape of the mold. The mold is positioned between an upper quench head and a lower quench head. The upper quench head is lowered and the glass sheet is quenched between the upper quench head and the lower quench head while the bending mold horizontally oscillates the hot glass sheet. When the quenching is completed, the glass sheet is lifted off the bending mold by blowing air through the lower quench head to hold the glass sheet against the upper quench head. The upper quench head is raised to a position above the pull-out rollers, the pull-out rollers are returned to their original position, and the glass sheet is deposited onto the rollers which transfer it to a cooling section where the glass sheet is cooled.

The first embodiment of the invention produces both bent and flat tempered glass sheets, depending upon the selected control mode of operation. To temper flat glass, the curved quench heads are replaced by flat quench heads.

The pull-out rollers are not pulled apart when tempering flat glass, but serve only to transport the glass sheet between the flat quench heads for quenching, and then move the glass to the cooling section for cooling.

The first embodiment can bend glass in two directions, longitudinally (the direction of glass flow) or transversely (normal to the direction of flow). Longitudinal bending is best suited for use with relatively narrow existing ovens, most of which accept glass sheets greater that 48 inches long.

In a second embodiment of the invention, the heat softened glass sheet is also transferred from an oven to a forming station where the glass sheet is dropped by pull-out rollers onto a bending mold where the glass sheet is sag-bent by gravity to conform to the shape of the mold. However, instead of quenching the sheet in the forming station, the bending mold and the glass sheet on it are transferred by a first shuttle out of the forming station and to a quench section where the first shuttle is placed between an upper quench head and a lower quench head. The upper quench head is lowered and air is blown against the surfaces of the glass sheet to quench the glass sheet. The glass sheet is oscillated horizontally while being quenched. When the glass sheet has been quenched, the upper quench head is raised and a second shuttle is moved into position above the glass sheet and the glass sheet is blown by air from the lower quench head against the bottom of the second shuttle where it is held by the air jets. The second shuttle is moved to a blow-up transfer section where the glass sheet is released and dropped onto rollers and conveyed through a cooling section to cool the glass sheet.

The second embodiment is a continuous system that produces either formed (bent) tempered glass or flat tempered glass, depending upon the selected control mode of operation. When production changes from bent glass to flat glass it is necessary to make some equipment set-up changes along with the appropriate electrical control selections and settings. The oven is moved to a position where it is in-line with the quench section, blow-up section and cooling section. Flat glass sheets are continuously heated and conveyed by powered rollers through the oven and into the quench unit.

To convert the second embodiment system to flat glass operation it is also necessary to replace curved-faced quench heads with flat-faced quench heads for most effective quenching and to install removable conveying rolls in the lower quench head. Flat glass is not oscillated linearly during quenching. The glass can be conveyed continuously through the operation because the combination of quench head length and glass velocity provide the necessary amount of quenching time for the glass to be properly tempered without oscillating the glass sheets.

In a third embodiment of the invention, a glass sheet is heated in an oven and transferred to a heated bending section, where the glass sheet is dropped by pull-out rollers onto a contoured bending mold where the glass sheet is sag-bent by gravity to conform to the shape of the mold. The bending mold is moved on a shuttle out of the heated bending section to a quenching section between an upper quench head and a lower quench head. The upper quench head is in quench position and does not need to be lowered. The shuttle is oscillated horizontally to aid the quenching. The shuttle is then moved to a blow-up section where it is positioned between a lower blow-up head and an upper cooling head. Air blows from the blow-up head against the glass sheet to lift the glass sheet off the bending mold and hold it against the upper head. While the glass sheet is being held against the upper head, a shifting roller conveyor is shifted underneath the glass sheet and the glass sheet is dropped thereon and conveyed to a cooling section.

The system described in the third embodiment is a continuous in-line system that produces either formed (bent) tempered glass or flat tempered glass sheets, depending upon the selected control mode of operation. When production is changed from bent to flat glass it is necessary to make some equipment set-up changes along with the appropriate electrical control selections and settings, as with the second embodiment. The system as described in the third embodiment can bend, quench, and cool two smaller pieces of glass, such as automotive side lights, at a time. This "two-up" system would be two lites moving in the flow direction, side-by-side.

BRIEF DESCRIPTION OF THE DRAWINGS

FIG. 10 is a front view of the detail of a pull-out roll assembly which forms a part of the invention;

FIG. 11 is a view in elevation of a pull-out roll;

FIG. 22 is a view in section similar to FIG. 18 showing a flat glass embodiment of the second embodiment of the invention;

FIG. 23 is a top plan view of the face of a curved quench head;

FIG. 24 is a side view of the face of the curved quench head of FIG. 23;

FIG. 25A is a side view of the face of a curved quench head;

FIG. 25B is a partial enlarged view of the area indicated by 25B in FIG. 25A;

FIG. 32 is a view in vertical section of the blow-up section taken as indicated by the lines and arrows 32—32 which appear in FIG. 27;

FIGS. 33–34 are similar to FIG. 32 and illustrate sequential steps of the transfer of the glass sheet from the bending mold to an upper cooling head;

FIG. 35 is a front view in elevation of details of a shifting conveyor used in blow-up section 113;

FIG. 37 is a view in section similar to FIG. 30 of an embodiment of the invention for flat glass tempering; and FIGS. 38–40 are views in elevation of the air system.

DETAILED DESCRIPTION

Embodiments of FIGS. 1–11

Figure 1:
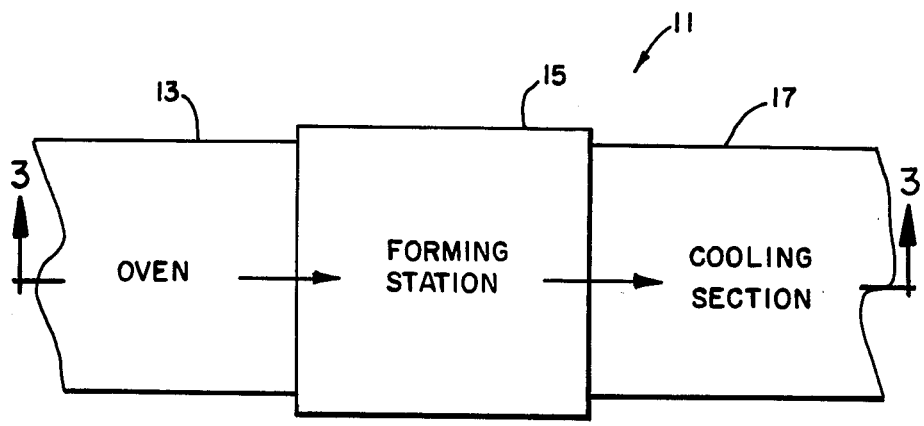
FIG. 1 is a schematic view in top plan of the general arrangement of the first embodiment of the invention.

Turning now to the drawings, there is shown in FIGS. 1–11 an apparatus 11 for bending and tempering glass sheets which includes an oven 13 for heating a sheet 14 of glass, a forming station 15 for bending and quenching the glass sheet 14 positioned adjacent to the oven 13, and a cooling section 17 located adjacent the forming station 15 for cooling the glass sheet 14. The oven 13, forming station 15, and cooling section 17 all lie in a straight line. Oven roller means, such as oven rollers 19 (FIG. 3), are positioned in oven 13 on rotatable shafts that are fixed in position and are adapted to rotate and move hot softened glass sheets 14 through oven 13 and into forming station 15. Forming station roller means, such as forming station rollers 21a, 21b are rotatably mounted on chains 29, 31 and are positioned in forming station 15 for moving the hot softened glass sheet 14 through forming station 15 and for dropping glass sheet 14 onto a forming mold; and cooling section roller means, such as cooling section rollers 23, are located in cooling section 17 in fixed rotatable position for moving the glass sheet 14 from forming station 15 through cooling section 17.

A bending or forming mold 25 is positioned in forming station 15 below forming station rollers 21a, 21b and is adapted to receive glass sheet 14 when rollers 21a, 21b are spread apart to form an opening through which the glass sheet 14 falls.

Forming station 15 includes stopping means, such as mechanical stop 27, for stopping the movement of the glass sheet 14, as it is moved through forming station 15 by forming station rollers 21a, 21b to a desired position over bending mold 25. The stopping means alternatively may be an electrical control circuit that stops the rotation of forming station rollers 21a, 21b when the glass sheet is at the desired position over bending mold 25 with a fixed stop for absolute positioning, when needed.

Forming station 15 further includes means for retracting forming station rollers 21a, 21b from beneath the heated glass sheet 14 and dropping the glass sheet 14 by gravity onto bending mold 25 where the hot glass sheet 14 sags by gravity into a desired bent shape.

Figure 2:
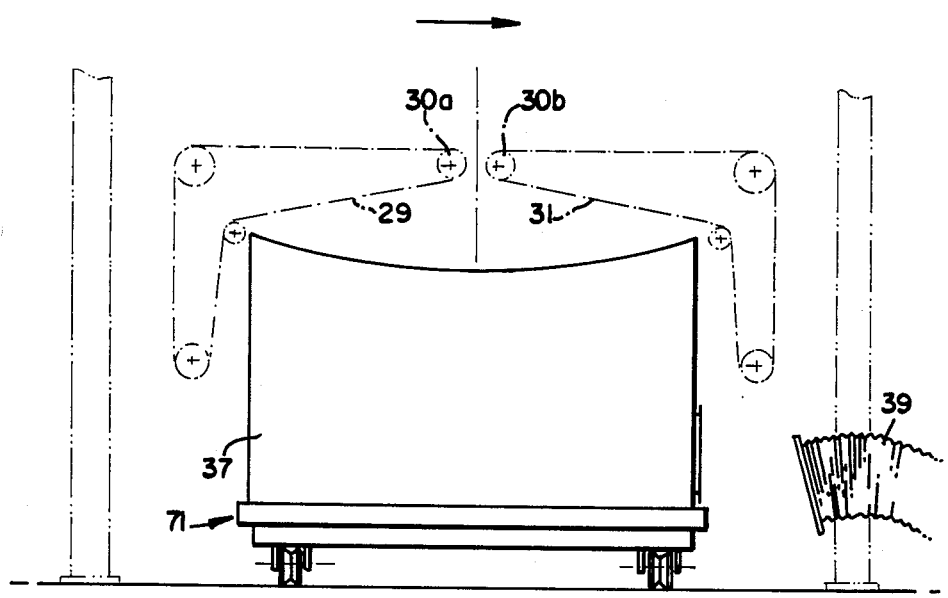
FIG. 2 is a front view in elevation of a forming station showing a cart for removing and replacing the quench heads.

FIG. 2 shows lower quench head 37 in its lower position beneath pull-out chains 29, 31. In this lower position, quench head 37 may be moved into position in forming station 15 or removed from forming station 15 when another quench head is to be inserted.

Figure 3:
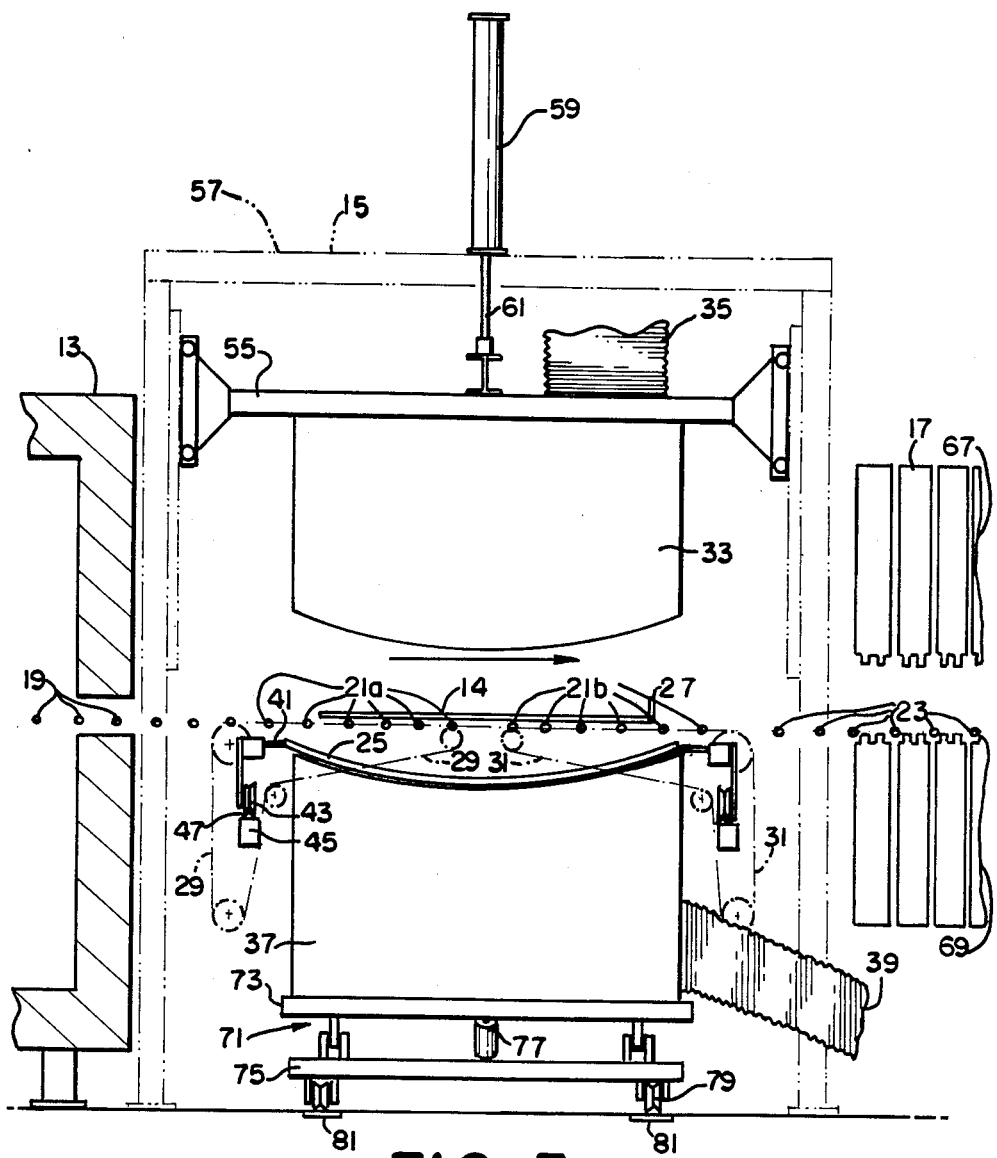
FIG. 3 is a view in vertical section taken as indicated by the lines and arrows 3—3 which appear in FIG. 1 and especially shows the forming station.

FIG. 3 shows the glass sheet 14 in position above mold 25 on pull out rollers 21a, 21b.

Figure 4:
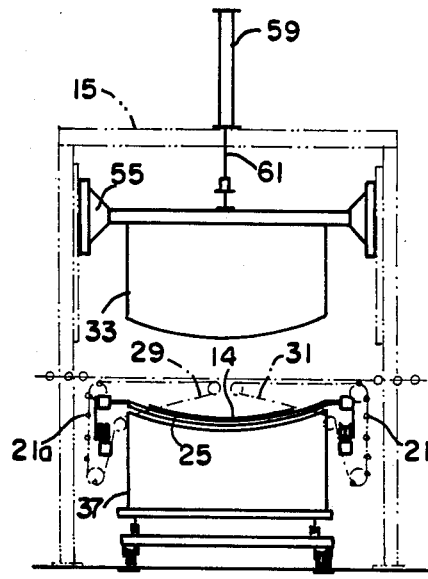
FIGS. 4–7 are views similar to FIG. 3 and illustrate sequential steps in a cycle of operation of the apparatus of FIG. 1.
Figure 5:
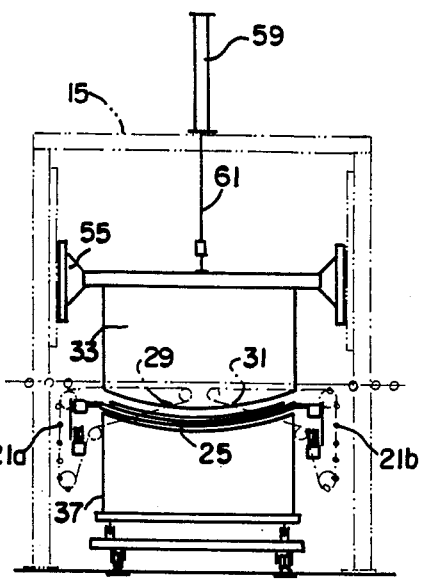
Figure 6:
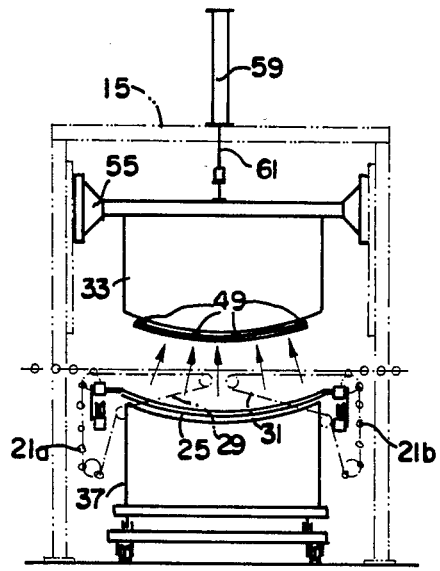
Figure 7:
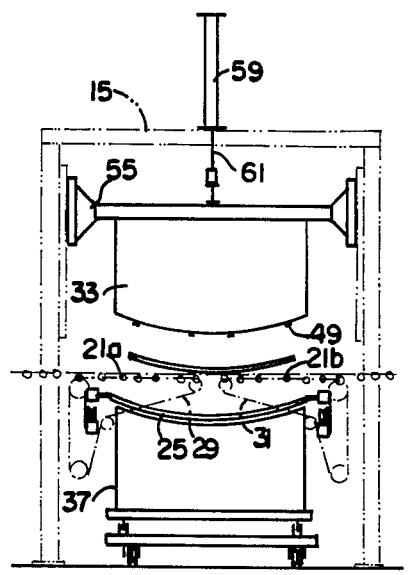

FIGS. 4 to 7 show progressive stages in the operation of the quench heads 33, 37 in forming station 15. In FIG. 4, the pull-out rollers on chains 29, 31 are in open position and the glass sheet 14 has been dropped onto the mold 25, but upper quench head 33 is still in its higher position. In FIG. 5, the upper quench head 33 has been lowered to its lowered position in close proximity to the upper surface of glass sheet 14 to better contact the upper surface with its jets of air. FIG. 6 shows the upper quench head 33 retracted to its later upper position with the quenched bent glass sheet 14 held against it by the jets of air from lower quench head 37, and FIG. 7 shows the pull-out rollers 21a, 21b in closed position and with the quenched bent glass sheet 14 having been dropped onto them for further transport to cooling section 17.

Figure 8:
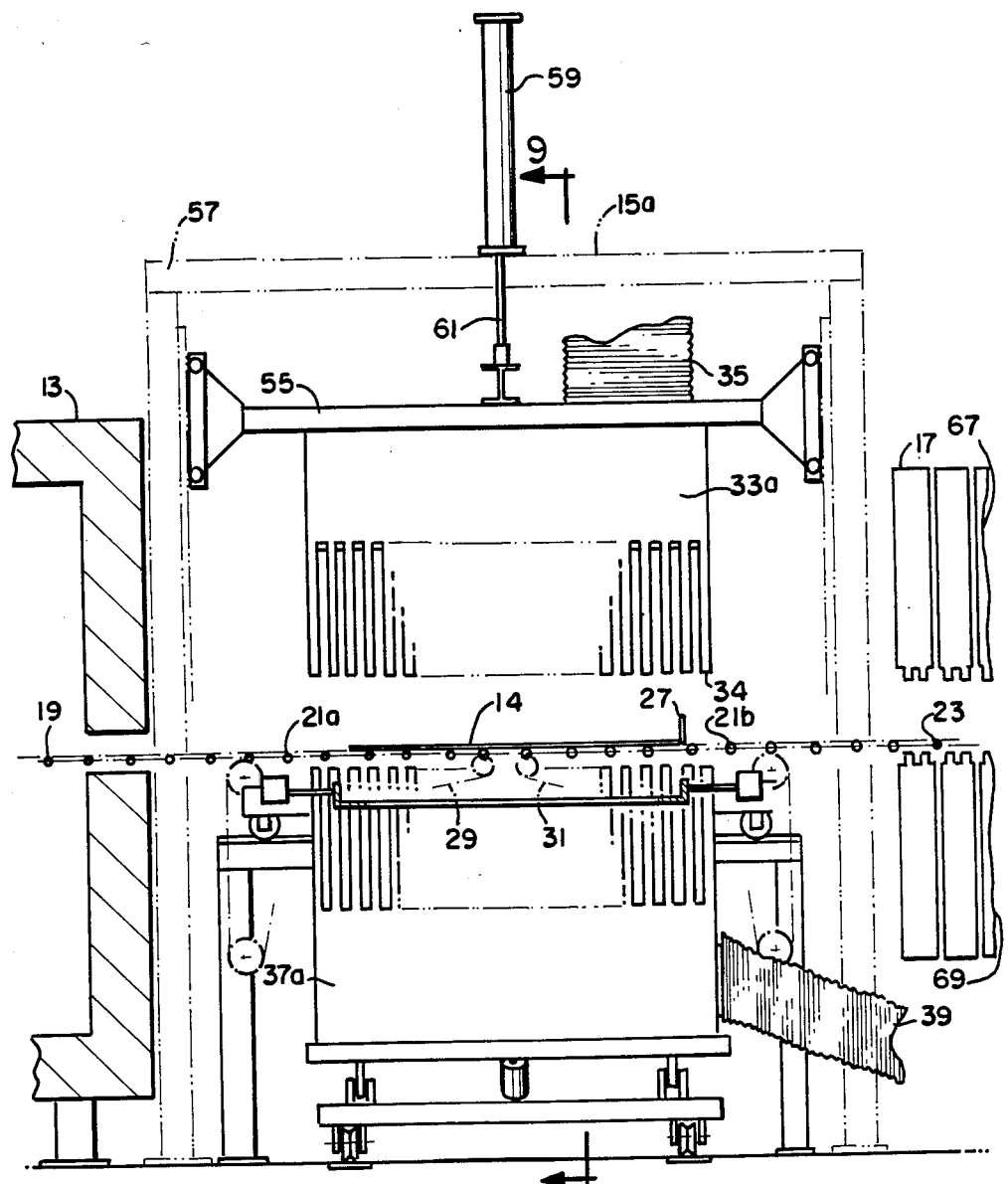
FIG. 8 is a view in section similar to FIG. 3 showing a forming station of the invention used for transverse bending instead of the longitudinal bending of FIG. 3.
Figure 9:
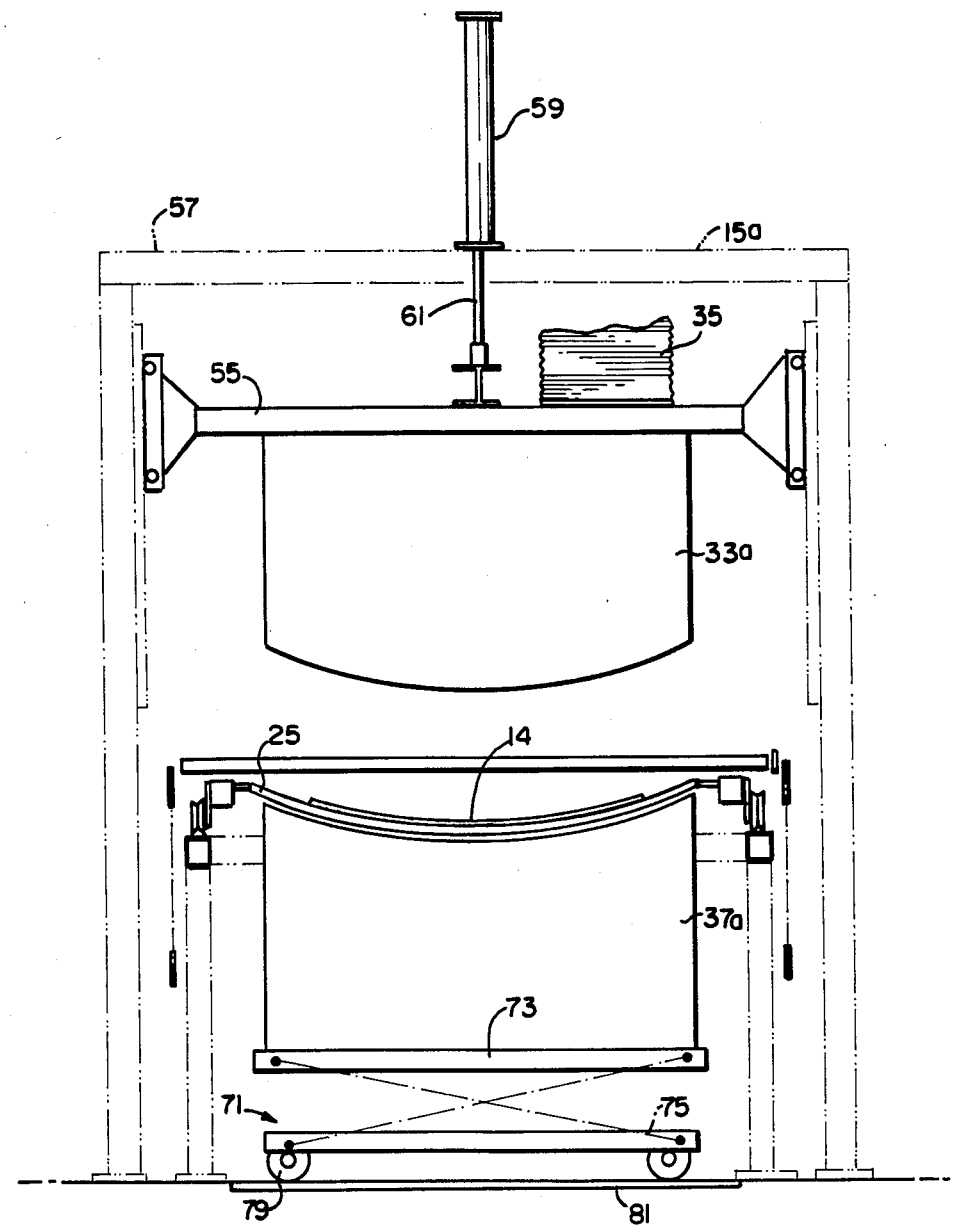
FIG. 9 is a view in section taken as indicated by the lines and arrows 9—9 which appear in FIG. 8.

FIG. 8 is a view similar to FIG. 3 but shows a forming station 15a adapted for transverse bending of the glass sheet, rather than the longitudinal bending of the FIG. 3 forming station, and FIG. 9 is a view of forming station 15a showing a transverse section in elevation taken as indicated by the lines and arrows 9—9 which appear in FIG. 8.

In a preferred embodiment of the invention, as shown in FIGS. 10–11, a roll rotation chain 20 is connected to rollers 21a, 21b and, when powered to move, causes forming station rollers 21a, 21b to rotate in a clockwise direction (as viewed from FIG. 11) and move the hot glass sheet 14 from oven 13 into forming station 15 until glass sheet 14 is centered over bending mold 25.

The retracting means includes pull-out transport chains 29, 31 that are attached to and move forming station rollers 21a, 21b, and are trained around spur gears 30a, 30b, sprocket wheels 31a, 31b, drive wheels 32a, 32b and chain tighteners 33a, 33b. When the hot glass sheet 14 is to be dropped on bending mold 25, a motor (not shown) activates drive wheels 32a, 32b, causing drive wheel 32a to rotate in a counterclockwise direction (FIG. 10) and drive wheel 32b to rotate in a clockwise direction to move pull-out transport chains 29, 31 downward. Spur gears 30a, 30b provide synchronized pull-out or parting motion of forming station rollers 21a, 21b.

Pull-out transport chains 29, 31 move rollers 21a to the left and move rollers 21b to the right to form a gap between them (FIGS. 4–6) through which the glass sheet 14 falls onto bending mold 25. Drive gears 32a, 32b quickly move forming station rollers 21a, 21b away from the parting line of spur gears 30a, 30b so that the glass sheet 14 falls onto bending mold 25 and sags into the mold by gravity, and the plastic state of the heated glass, to assume the bent shape of bending mold 25.

Roll rotation chain 20, which stops moving when glass sheet 14 is centered over bending mold 25, remains in contact with rollers 21a, 21b when stopped, and causes rollers 21a to rotate in a clockwise direction and rollers 21b to rotate in a counterclockwise direction during the pull-out motion of pull-out transport chains 29, 31. The forming station rollers 21a, 21b are thereby in rolling contact with glass sheet 14 because they rotate towards the center of forming station 15 as they are pulled out from under glass sheet 14, and this rolling contact with glass sheet 14 prevents the rollers 21a, 21b from marking the underside of glass sheet 14. If rollers 21a, 21b did not rotate as they were pulled from under the glass sheet, the sliding contact between rollers 21a, 21b would mark the underside of the glass sheet 14.

Referring to FIG. 11, there is shown hardened rollers 22 which ride on a fixed frame rail (not shown) to provide a flat level bed for proper alignment from roll 21a to roll 21a.

Forming station 15 further includes means for quenching the bent glass sheet, such as upper quench head 33 and lower quench head 37 (FIG. 3). A quench blower (not shown) supplies air to upper quench head 33 through upper quench duct 35 and to lower quench head 37 through lower quench duct 39.

Bending mold 25 includes means for oscillating bending mold 25 horizontally when mold 25 is positioned between upper quench head 33 and lower quench head 37 while the glass sheet 14 is being quenched. The oscillating means includes a frame 41 that supports bending mold 25, frame wheels 43 attached to frame 41, rail support frame 45 having rails 47, and a motor (not shown) for oscillating frame 41 on rails 47 of rail support frame 45 transversely to the direction of movement of sheet 14.

Forming station 15 further includes air jet means for lifting the glass sheet 14 off bending mold 25 after the glass sheet 14 has been bent, and holding it against cushioned stop bars or stand-offs 49 (FIG. 7) mounted on the face of upper quench head 33.

Forming section 15 further includes means for raising and lowering upper quench head 33. The glass sheet 14 moves upwardly with upper quench head 33 as the glass sheet 14 is held against cushioned stop bars 49 by the upward force of the air blown through lower quench head 37. The upper quench head 33 raising and lowering means includes quench head lifting frame 55 which is attached to upper quench head 33, and which is raised and lowered within the confines of forming station main frame 57 by a hydraulic lifting device 59 that raises and lowers a piston 61 connected to upper quench head lift frame 55.

When upper quench head 33 and the glass sheet 14 are raised above the level of the forming station rollers 21a, 21b when in open position, means are activated for returning forming station rollers 21a, 21b from their retracted position to their closed position beneath the glass sheet 14. The returning means includes the pull-out transport chains 29, 31 that are activated to return forming station rollers 21a, 21b to their original closed position where the quenched glass sheet 14 is deposited on them and they resume rotating to move the quenched glass sheet 14 through forming station 15 to cooling section 17.

Cooling section 17 (FIG. 3) includes an upper cooling head 67 and a lower cooling head 69 that are supplied with a source of cooling air, such as from a cooling blower (not shown), to cool the glass sheet 14 as the glass sheet is conveyed through cooling section 17 by cooling section rollers 23.

In operation of the first embodiment, a glass sheet 14 is heated in oven 13 and is conveyed through oven 13 by oven section rollers 19. The hot glass sheet 14 is conveyed into forming station 15 by forming station rollers 21a, 21b, where the travel of the glass sheet 14 is stopped by mechanical stop 27 which centers sheet 14 above bending mold 25 which is supported by frame 41. Rollers 21a, 21b are powered to move by roll rotation chain 20. Pull-out transport chains 29, 31 retract and separate the forming station rollers 21a, 21b to form a gap beneath the glass sheet 14 and to drop the glass sheet 14 by gravity onto the bending mold 25 where the hot glass sheet 14 sags by graviy into the desired bent shape conforming to the mold. Roll rotation chain 20, when stopped, causes rollers 21a, 21b to rotate during the pull-out motion, so that no sliding (and therefore no marking) occurs at contact with the underside of the glass sheet 14.

Upper quench head 33 is lowered by hydraulic device 59 into a position of optimum clearance from the upper surface of the bent glass sheet 14. Quenching air then blows through upper quench head 33 and lower quench head 37 against the upper and lower surfaces of the glass sheet 14.

The bent glass sheet 14 and bending mold 25 are oscillated in a transverse direction on rails 47 while being quenched between upper quench head 33 and lower quench head 37. When the glass sheet 14 has been sufficiently quenched, the bent glass sheet 14 is blown upwardly from bending mold 25 by air from lower quench head 37 which raises it and holds it against cushioned stop bars 49 (FIG. 6) of upper quench head 33.

Then upper quench head 33 is raised by the hydraulic device 59 and the glass sheet 14 is moved upwardly and held against upper head 33 by the upward force of air blowing against the glass sheet 14. After upper quench head 33 and the quenched glass sheet 14 are raised, forming station rollers 21a, 21b are returned to their original position and resume rotating. The quenched bent glass sheet 14 is then dropped onto forming station rollers 21a, 21b and they convey the quenched glass sheet 14 onto cooling section rollers 23 and into cooling section 17 where the glass sheet 14 is cooled.

The apparatus 11 produces both flat and curved tempered glass sheets, depending upon the selected mode of operation. Along with the proper mode selection, curved quench heads are appropriate for bent glass sheets and flat quench heads are appropriate for flat glass sheets. The quench heads are curved to conform substantially to the shape of bending mold 25 to provide the optimum amount of quenching. To temper flat glass sheets, upper quench head 33a and lower quench head 37a are flat-faced as shown in FIG. 8. Flat hot glass sheets that are transported from oven 13 to forming station 15 where the hot glass sheet is quenched between flat upper quench head 33a and flat lower quench head 37a before the glass sheet is conveyed to the cooling section 17.

Lower quench head 37 (FIG. 3) rests on a lift table 71 which includes a movable top platform 73, a bottom platform 75 and a lifting actuator piston 77 that moves top platform 73 vertically between a raised position of FIG. 3 and a lowered position of FIG. 2. Wheels 79 are attached to table 75 for moving it along floor rails 81 in a direction transverse to the movement of the glass sheet 14.

To replace the lower quench head 37, table 71 is fully lowered (FIG. 2) so that the pull-out roll transport chains 29, 31 are cleared by lower quench head 37 when table 71 and head 37 are rolled out on floor rails 81 and removed from the forming station 15. Upper quench head 33 is removed from forming station 15 by using hydraulic device 59 to lower upper quench head 33 onto an empty table 71 that has been elevated to receive it, and rolling the table 71 and upper quench head 33 out of forming station 15 on floor rails 81.

The apparatus 11 is adapted to bend glass longitudinally in the direction of glass flow, or transversely in the direction normal to the direction of glass flow, by making appropriate changes in the set-up.

The system hereinbefore described is best suited for glass that is approximately 48 inches or less in longitudinal dimension, and for use with relatively narrow existing ovens that accomodate glass sheets that may be greater than 48 inches long.

The apparatus 11 hereinbefore described is not limited to bending glass sheets in their longitudinal dimension. For example, FIG. 9 shows a view in transverse section as shown by the lines and arrows 9—9 in FIG. 8, and shows that the glass sheet may be bent in the transverse direction, with glass sheet oscillation during quenching of flat glass sheets and transversely bent sheets being in the longitudinal direction.

Referring now to FIG. 9 for transverse bending, this figure differs from FIG. 3 for longitudinal bending, only in bending direction and the direction or orientation of the elements that perform the bending/quench operation. Specifically, glass oscillation is in the longitudinal direction and both quench heads 33, 37 are rotated 90 degrees from their previous position in FIG. 3.

The sequence of operation is the same for longitudinal and transverse bending.

Embodiment of FIGS. 12–26

Turning now to a second embodiment of the invention which is shown in FIGS. 12-26, there is shown an apparatus 101 for the continuous bending of glass sheets, which includes an oven 103 for heating a sheet 114 of glass. A heated forming station or bending section 105 is attached to the oven 103, and abuts it so that the heated glass sheet 114 is transported from the oven 103 to the heated bending section 105 without being exposed to cool air.

A quench section 107 having an upper quench head 109 (FIG. 18) and a lower quench head 111 is located adjacent to the heated bending section 105 at a position at right angles to the flow of glass sheets from oven 103 to heated bending section 105.

A blow-up transfer and cooling section 113 (FIG. 12) having a blow-up head 115 (FIG. 20) and a cooling head 117 is located adjacent the quench section 107 (FIG. 12) at a position at right angles to the flow of glass sheets from heated bending section 105 to quench section 107.

Cooling section 119 is located adjacent to the blow-up transfer and cooling section 113 and is in-line with the blow-up transfer and cooling section 113 and quench section 107. Cooling section 119 (FIG. 20) includes an upper cooling duct 121 and a lower cooling duct 123.

First roller means such as rollers 125 (FIG. 13) are positioned in oven 103 and in heated bending section 105 for conveying the glass sheet 114 from the oven 103 into heated bending section 105. Second roller means such as pull-out rollers 127a, 127b (FIGS. 13–15) are positioned in heated bending section 105 and operate in a similar manner as pull out rollers 21a, 21b as previously described in the first embodiment of the invention.

Figure 15:
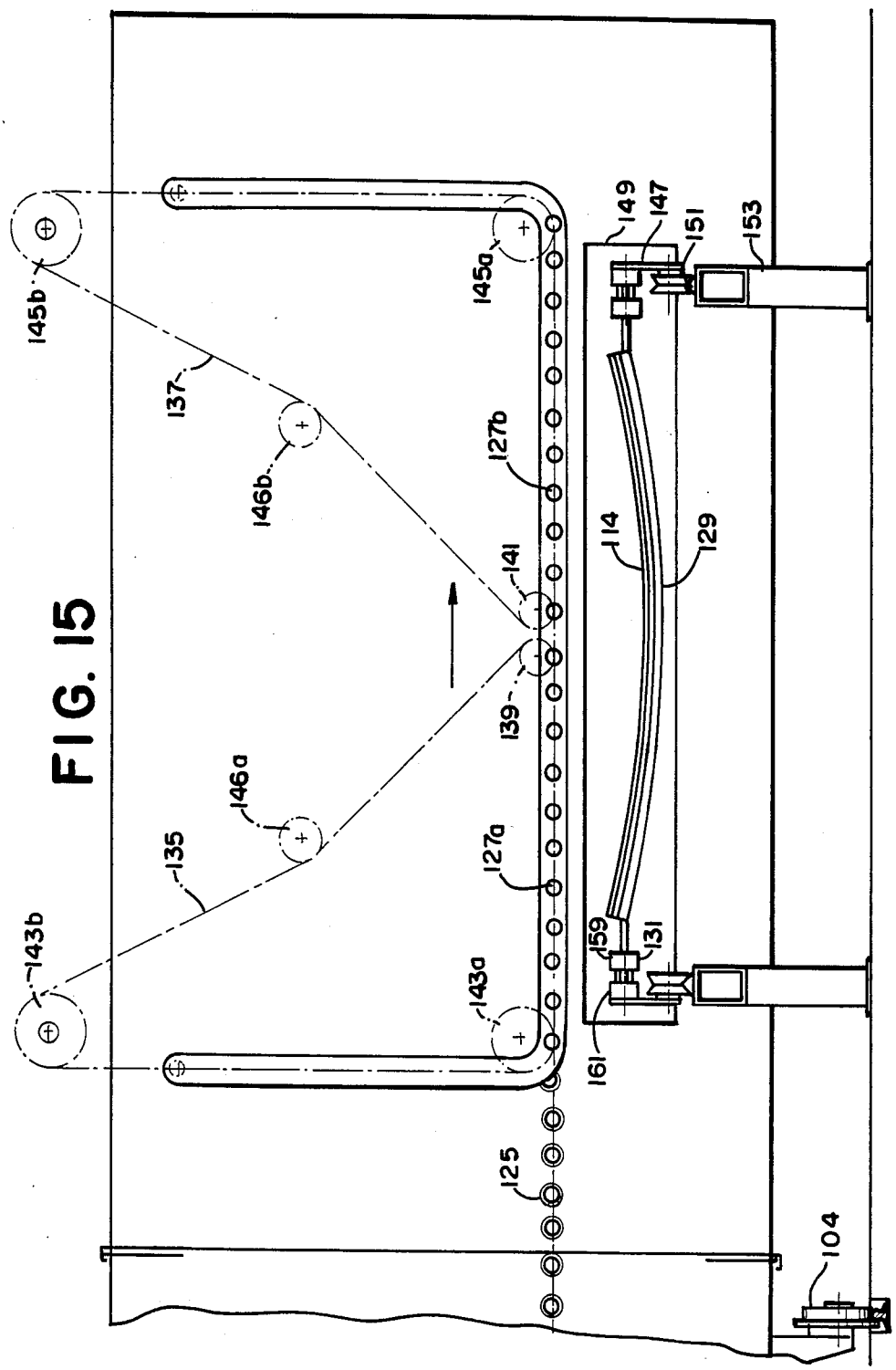
FIG. 15 is a view in section of the bending unit taken as indicated by the lines and arrows 15—15 in FIG. 12.
Figure 16:
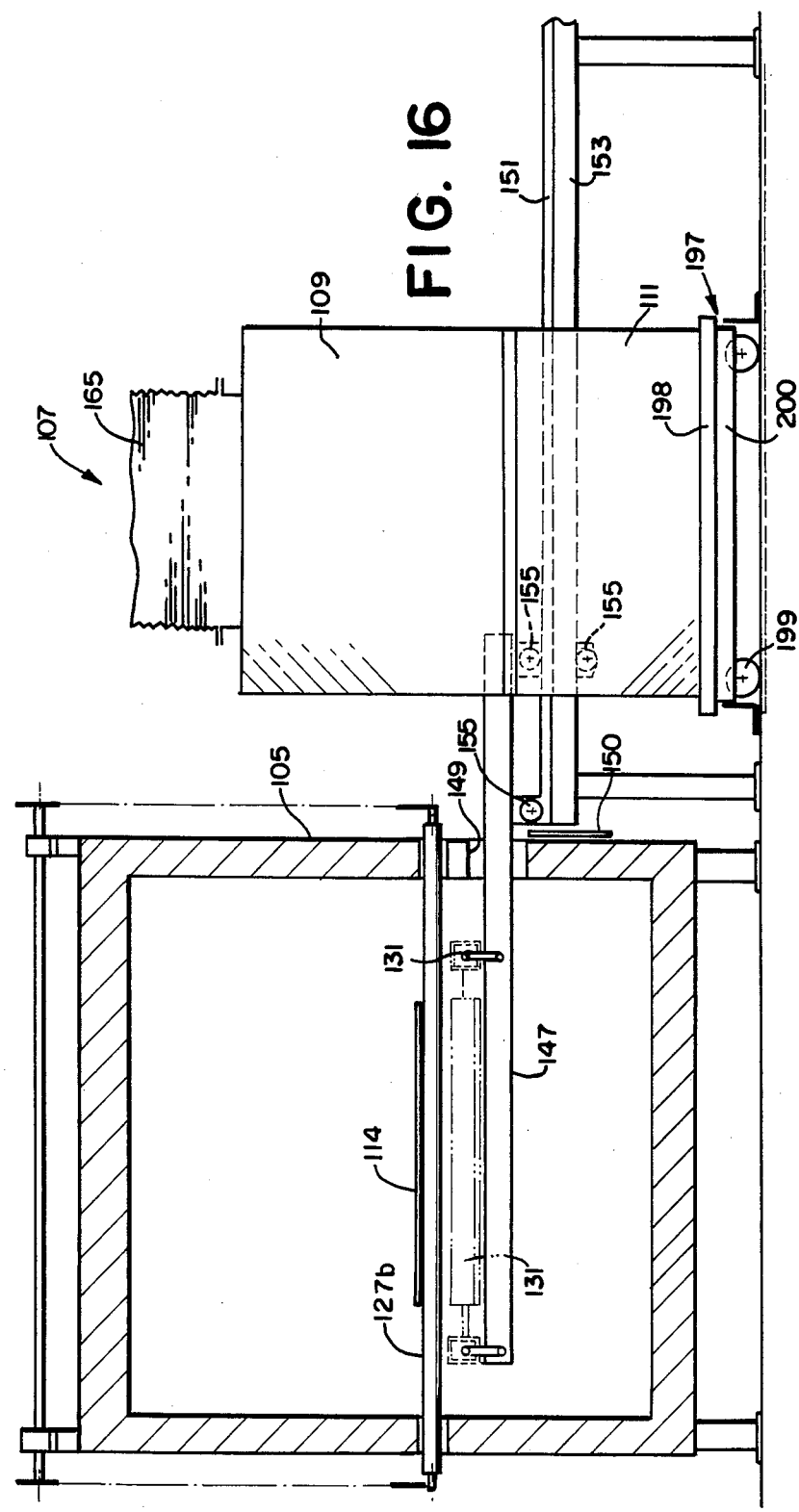
FIG. 16 is a view in section of the bending section and quench section taken as indicated by the lines and arrows 16—16 in FIG. 12.

A bending mold 129 is located in the heated bending section 105 below pull-out rollers 127a, 127b when they are in the closed position of FIGS. 13 and 15. A frame 131 supports bending mold 129 in a similar manner to frame 41.

Stop means for the glass sheet is provided by a stop 133 (FIG. 13) positioned in heated bending section 105 to stop the travel of the glass sheet 114 when it is positioned above bending mold 129. The stop means may also be an electrical control device (not shown) that stops pull-out rollers 127 from rotating when the glass sheet 114 is positioned above bending mold 129.

Pull-out means for retracting pull-out rollers 127a, 127b are located in bending section 105 and include (FIG. 15) pull-out roller chains 135, 137, spur gears 139, 141, sprocket wheels 143a, 143b, 145a, 145b and chain tighteners 146a, 146b. When the hot glass sheet 114 is to be dropped on bending mold 129, the spur gears 139, 141 are activated by a motor (not shown) to provide synchronized pull-out or parting motion of pull-out rollers 127a, 127b. Spur gears 139, 141 move pull-out transport chains 135, 137 in opposite directions and quickly retract pull-out rollers 127a, 127b away from the parting line between spur gears 139, 141 to form a gap through which the glass sheet 114 falls flatly onto bending mold 129 and sags by gravity, and the plastic state of the heated glass, to fit bending mold 129. In their retracted position (FIG. 14), pull-out rollers 127a, 127b move into roll travel clearance slots as shown FIG. 14 in the walls of heated bending section 105.

Figure 17:
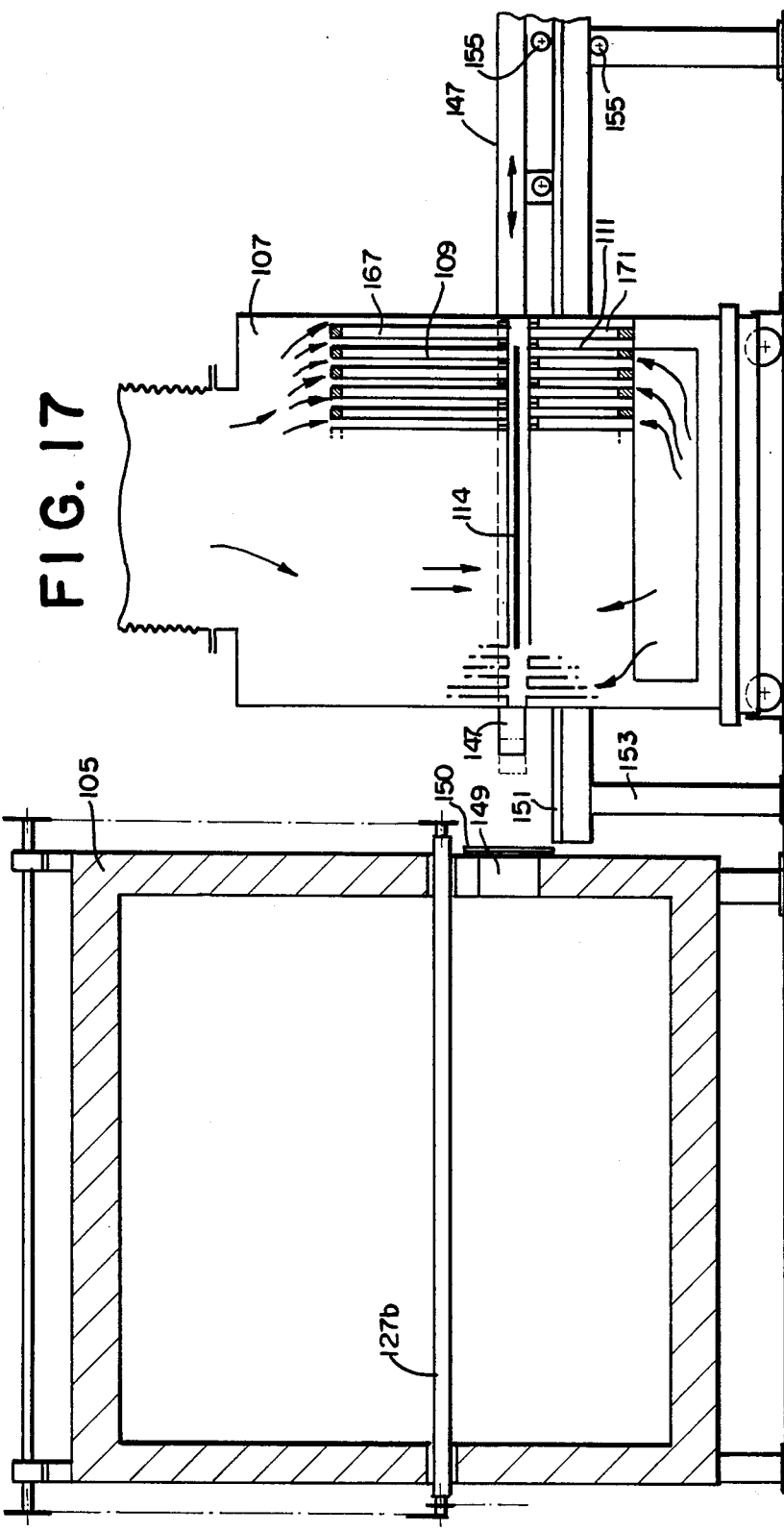
FIG. 17 is a view in section similar to FIG. 16 but at a later stage in operation.
Figure 18:
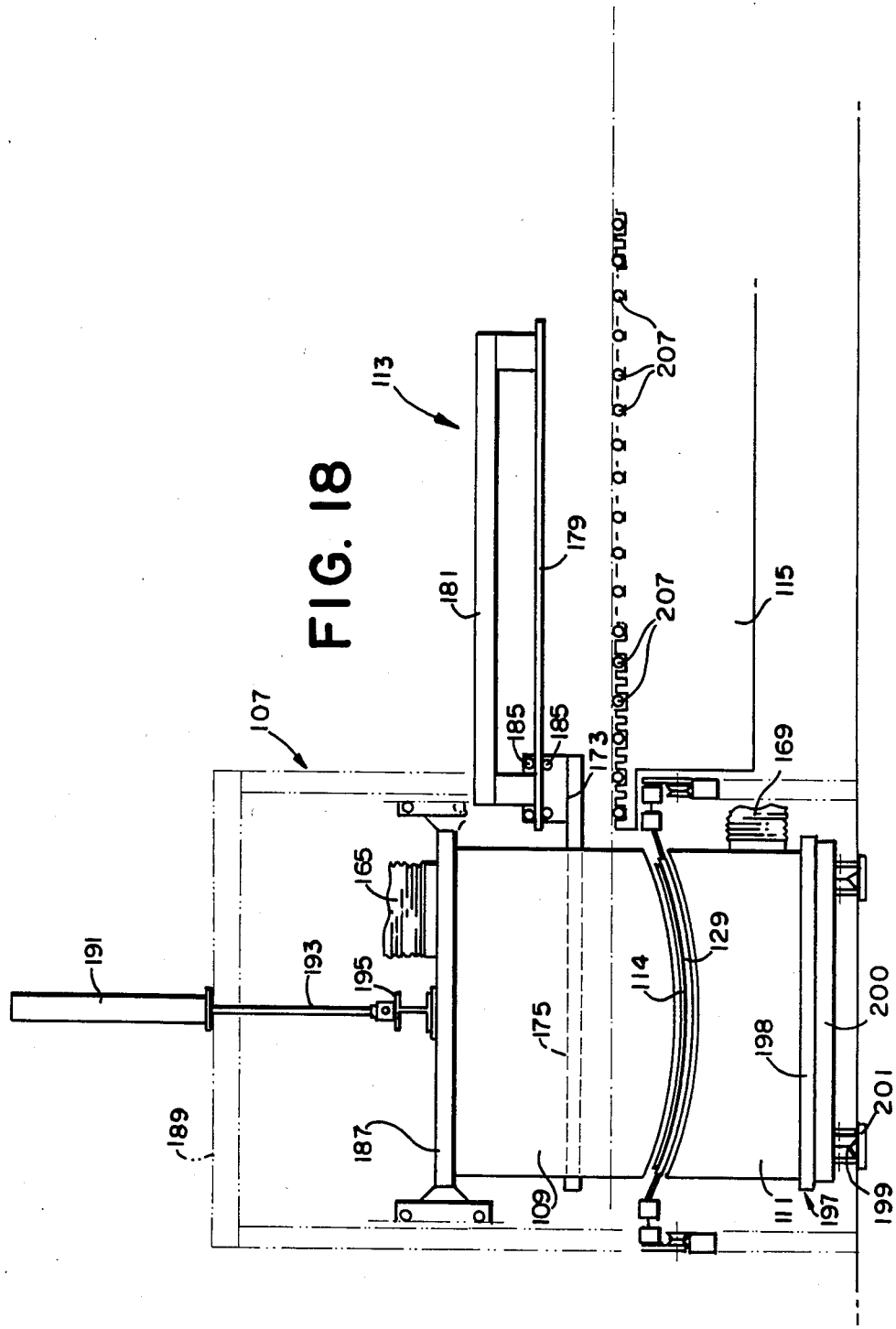
FIG. 18 is a view in section of the quench section and blow-up transfer section taken as indicated by the lines and arrows 18—18 which appear in FIG. 12.

A transfer shuttle 147 (FIGS. 16, 17) supports bending mold 129. Shuttle transfer means moves transfer shuttle 147 from a first position (FIG. 16) below pull-out rollers 127a, 127b through an opening 149 in heated bending section 105 to a second position in quench section 107 (FIG. 17). Door 150 is closed over opening 149 when shuttle 147 moves out of bending section 105. The shuttle transfer means includes shuttle rails 151 (FIG. 17) supported by shuttle rail frame 153 that extends from heated bending section 105 through quench section 103 between the upper and lower quench heads. Shuttle wheels 155 are attached to shuttle 147 and engage shuttle rails 151 to move shuttle 147 along shuttle rail frame 153. A shuttle drive (not shown) moves shuttle 147 along shuttle rail frame 153 and also may oscillate shuttle 147 and the glass sheet 114 horizontally for optimum quenching and tempering of the glass sheet 114.

The frame 131 that supports bending mold 129 may include lifting means for moving the frame 131 between an upper position (FIG. 13) for supporting bending mold 129 close to pull-out rollers 127a, 127b so the hot glass sheet 114, when dropped onto mold 125, falls only a short distance, and a lower position (FIG. 15) for moving shuttle 147 out of heated bending section 105 to quench section 107. The lifting means includes a top gear 159 (FIG. 14) connected to frame 131 and a bottom gear 161 connected to shuttle 147. Frame 131 is lowered into shuttle 147 by rotating top gear 159 until it reaches the same height as bottom gear 161. At this point, the shuttle 147 and bending mold 129 can fit through exit opening 149 in heated bending unit 105.

Quench section 107 includes quenching means such as quench blower 163 (FIG. 26A) that blows air through air inlet 165 and air channels 167 (FIG. 17) of upper quench head 109 and air inlet 169 (FIG. 26A) and air channels 171 (FIG. 17) of lower quench head 111. Upper quench head 109 and lower quench head 111 are curved to conform to the shape of the bent glass supported on bending mold 129.

FIGS. 23, 24, 25A and 25B show the typical arrangement of air jets 167 in quench head 109. The overall pattern of air jets 167 can best be seen in FIG. 23, where the air jets 167 are arranged in rows with alternate rows of interstices or spaces between the air jets 167.

Note that the alternating arrangement of wafer-like channels 167, as shown in FIGS. 23, 24, 25A, 25B, and spaces therebetween provide for achieving a high density pattern of air jets per unit of glass area and for the exhaust or spent air to escape horizontally out the ends of the spaces between air channels 167. Also note that the alternating rows of air channels 167 and spaces are at right angles to the direction of glass oscillation. This provides optimum coverage of the glass, with resulting uniformly tempered glass.

FIG. 24 shows the arrangement of air jets 167 in a quench head 109 with a curved face.

FIGS. 25A and 25B provide a close-up view of the interstices between air jets 167. The interstices are the spaces in which catcher bars 175 of blow-up shuttle 173 are inserted.

A blow-up shuttle 173 (FIGS. 18–20) having glass catching means such as glass catcher bars 175 is located in blow-up transfer and cooling section 113. Blow-up shuttle transfer means moves blow-up shuttle 173 between a first position (FIG. 18) where glass catcher bars 175 are fully inserted in the interstices of air channels 167 of upper quench head 109, and a second position (FIG. 20) where glass catcher bars 175 are positioned in blow-up transfer and cooling section 113 with the trailing ends 177 of glass catcher bars 175 still inserted in the interstices of air channels 167 for easy re-entry during the next cycle. Blow-up shuttle transfer means includes blow-up shuttle rails 179 (FIGS. 18–20) supported by a shuttle frame 181 that is connected to the structural support frame 183 (FIG. 20) of the blow-up transfer and cooling section 113 and cooling section 119. Blow-up shuttle wheels 185 are attached to blow-up shuttle 173 and engage blow-up shuttle rails 179. Blow-up shuttle 173 is moved along blow-up shuttle rails 179 by a blow-up shuttle drive (not shown).

Upper quench head raising means are provided to raise upper quench head 109 to expose glass catcher bars 175 of blow-up shuttle 173 when glass catcher bars 175 are fully inserted in the interstices of air channels 167 of upper quench head 109. The upper quench head raising means includes a lift frame 187 (FIG. 20) that is raised and lowered within a quench main frame 189 by a hydraulic lifting device 191 located on top of the quench main frame 189. Hydraulic lifting device 191 includes a movable piston 193 that is attached to lift frame 187 by a connecting bar 195. The piston 193, as it is raised and lowered, raises and lowers upper quench head 109. Upper quench head raising means also provides an easy way for mounting other quench heads which are attached to lift frame 187.

Lower quench head 111 (FIG. 20) is supported by a lift table 197 which includes a movable top platform 198, a stationary bottom platform 200 and a lifting means such as a piston (not shown) that moves top platform 198 between a raised position and a lowered position. Wheels 199 are attached to table 197 for moving it along floor rails 201 for removal and replacement of the quench heads. Table 197 changes the elevation of the lower quench head as required by the glass curvature and optimum face-to-glass distance for quenching.

Removal and replacement of the relatively large and heavy quench heads 109, 111 are facilitated by using hydraulic device 191 to lower the upper quench head 109 onto lower quench head 111 and rolling the quench heads 109, 111 in and out of quench section 107 on table 197 and floor rails 201.

Figure 19:
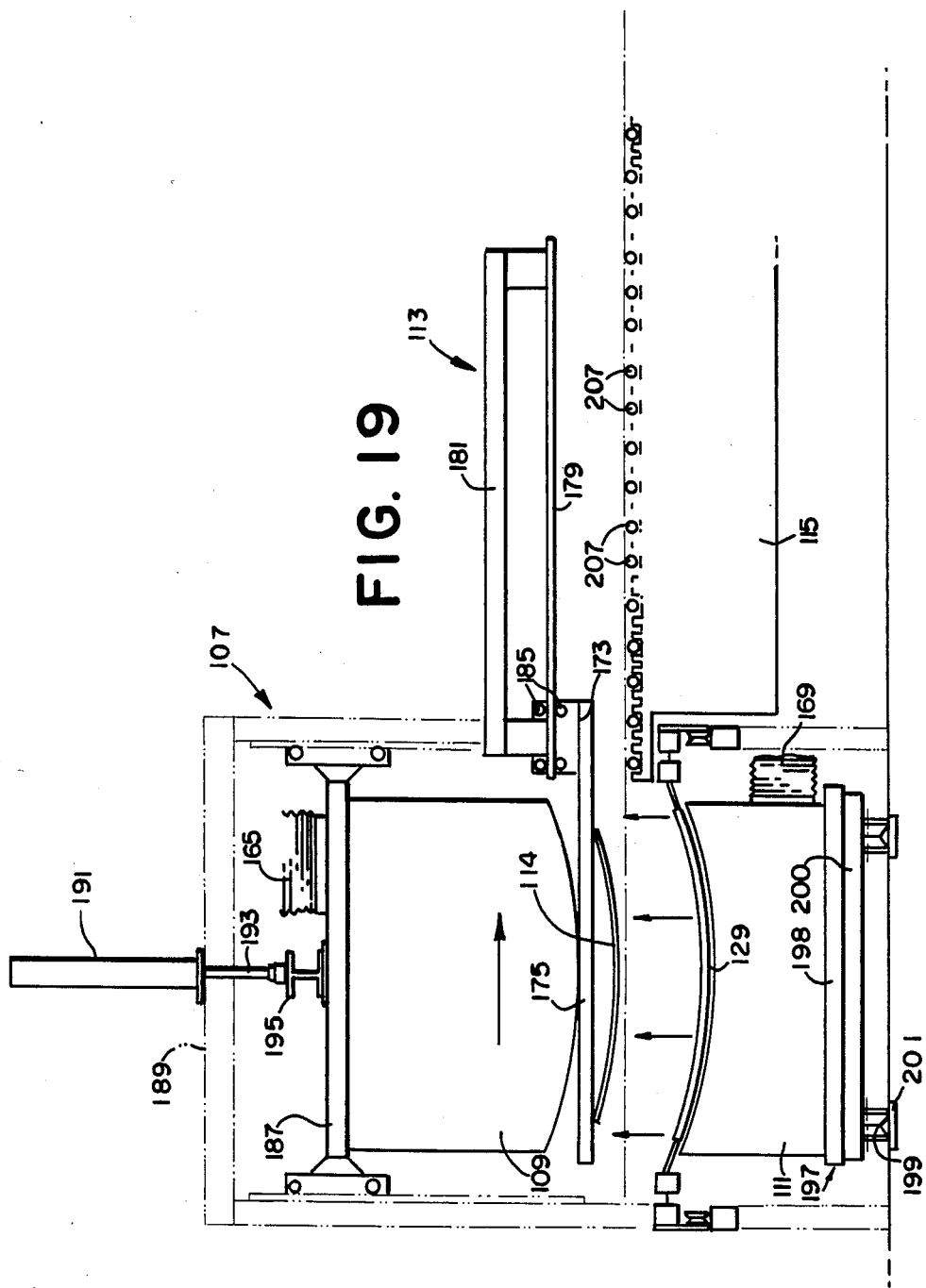
FIGS. 19–21 illustrate the sequential steps of the transfer of the glass from the bending mold to the blow-up shuttle.

Means are provided for lifting the glass sheet 114 off bending mold 129 and holding it against glass catcher bars 175 when the glass catcher bars 175 are exposed after upper quench head 109 has been raised. The lifting means includes a damper 203 (FIG. 26A) pivotally mounted in air inlet 165 of upper quench head 109. When it is desired to quench a sheet of glass 114, the air provided by quench blower 163 is sent evenly to both air inlet 165 of upper quench head 109 and air inlet 169 of lower quench head 111. To raise the glass sheet off bending mold 129, damper 203 is closed, so that all of the air provided by quench blower 163 is directed through air inlet 169 of lower quench head 111. The differential in air pressure between upper quench head 109 and lower quench head 111 raises the glass sheet 114 and holds it against the glass catcher bars 175 of blow-up shuttle 173 as shown in FIG. 19.

Figure 20:
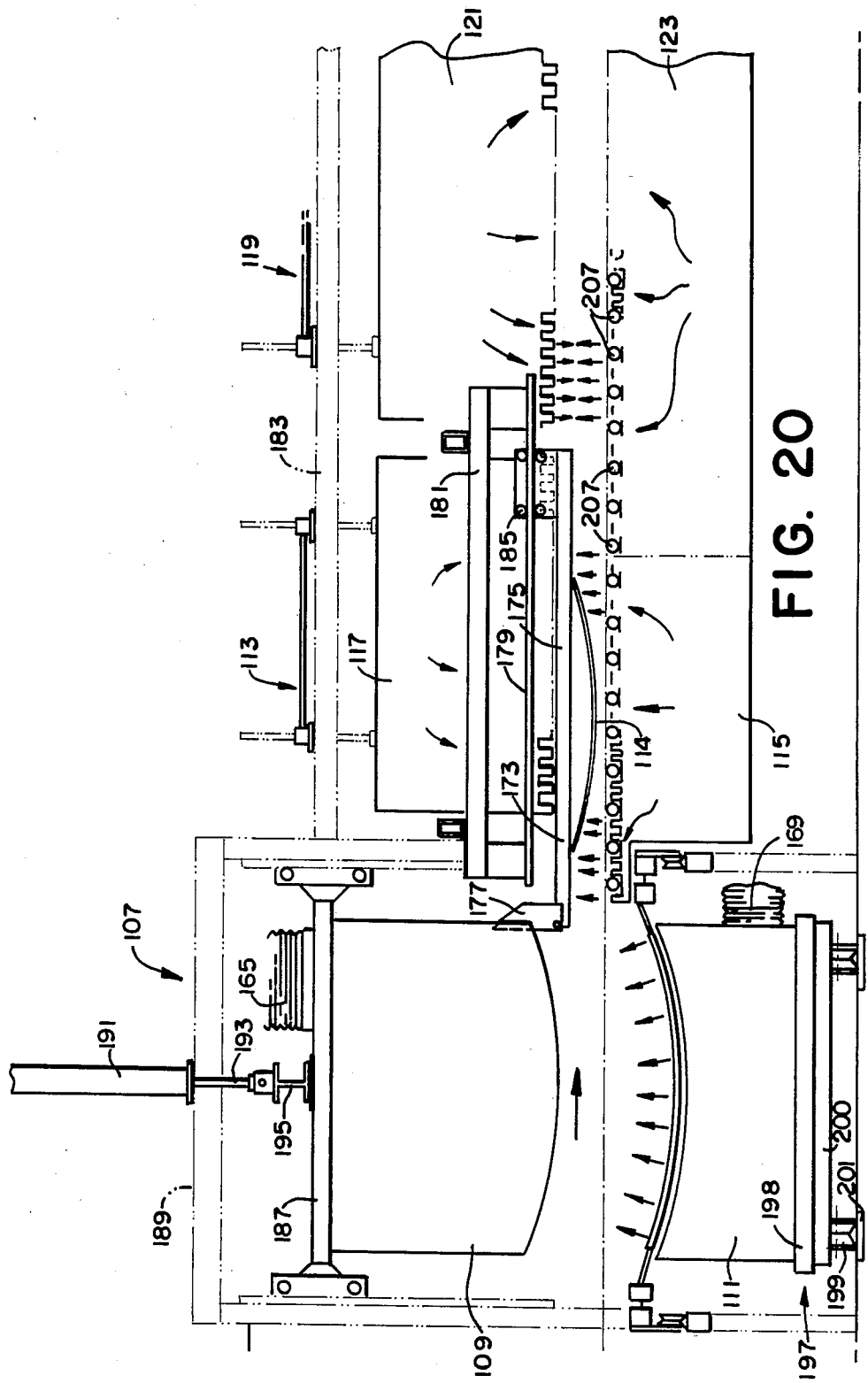
Figure 21:
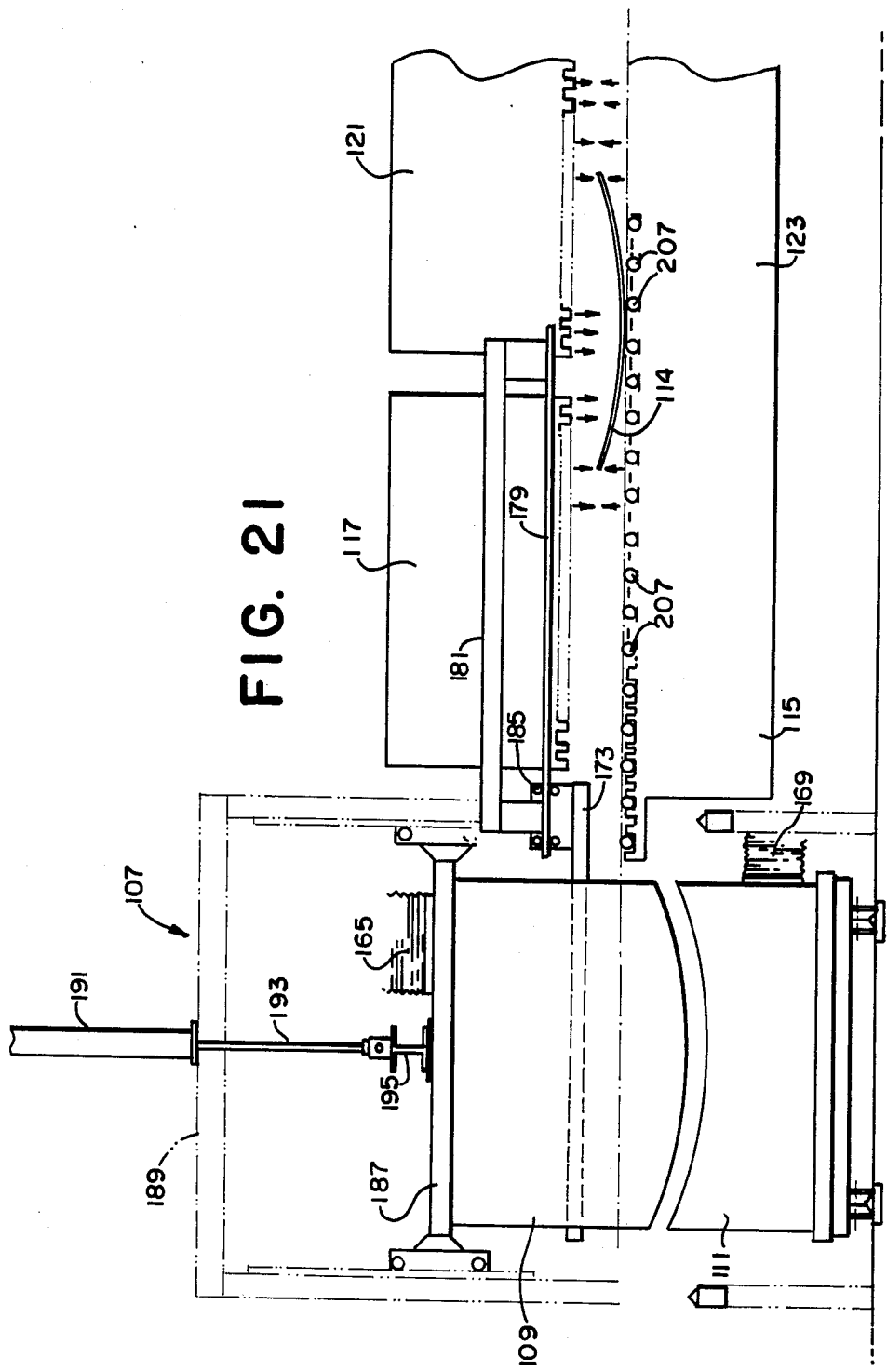
Figure 26A:
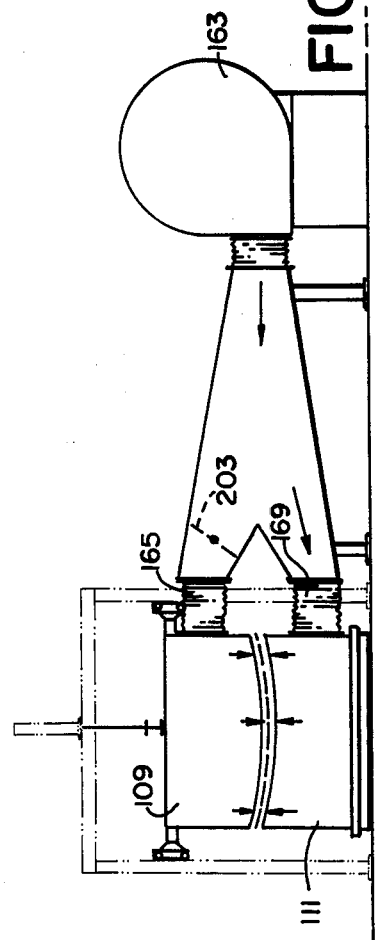
FIGS. 26A–C are side views of the air system of the second embodiment of the invention.
Figure 26B:
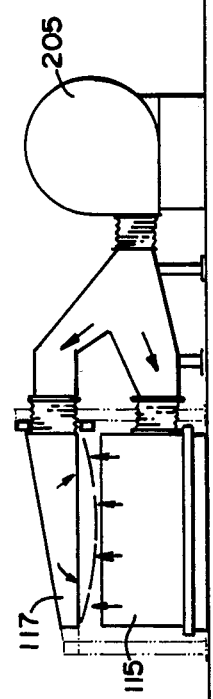
Figure 26C:
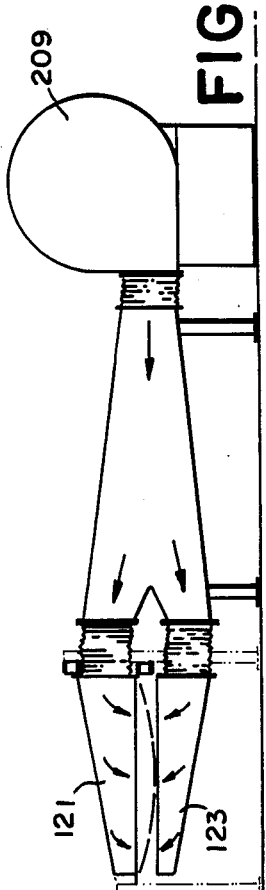
Figure 27:
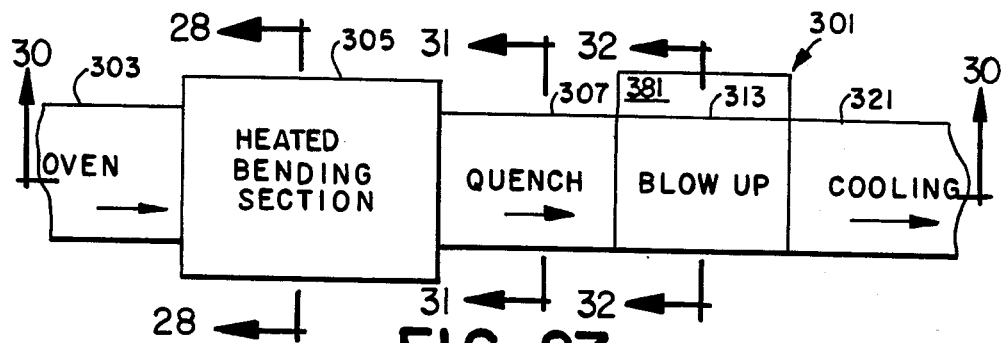
FIG. 27 is a top plan view of the general arrangement of a third embodiment of the invention.

The blow-up shuttle 173 moves the sheet of glass 114 being held against it from quench section 107 to the blow-up transfer and cooling section 113 (FIG. 20). Blow-up blower 205 (FIG. 26B) provides blow-up head 115 with a source of air sufficient to hold the glass sheet against glass catcher bars 175 as blow-up shuttle 173 moves into blow-up transfer and cooling section 113. The amount of air provided by blow-up blower 205 is variable so that when the blow-up transfer shuttle 173 has stopped its travel within blow-up transfer and cooling section 113, the amount of air blown through blow-up head 115 is decreased to lower the glass sheet from the glass catcher bars 175 of shuttle 173 onto the roller means which are located in blow-up transfer and cooling section 113 and cooling section 119 to convey the bent glass sheet therethrough. The roller means includes a plurality of rollers 207 (FIGS. 20-22).

When the glass sheet 114 has been lowered onto rollers 207, it is cooled by cooling means located in blow-up transfer and cooling section 113 and in cooling section 119. The cooling means includes cooling head 117 of blow-up transfer and cooling section 113 and upper cooling duct 121 and lower cooling duct 123 of cooling section 119. A cooling blower 209 (FIGS. 26C) provides a cool air supply to cooling head 117 and to upper cooling duct 121 and lower cooling duct 123. Note that while the glass sheet 114 is being transferred along rollers 207, a flow of air through blow-up head 115 (FIGS. 20-22) is maintained to provide additional cooling.

Apparatus 101 can temper flat glass sheets as well as bent glass sheets. To temper flat glass sheets, the oven 103 is moved (FIG. 12) to a position in-line with quench section 107 and sections 113, 117. Flat-faced quench heads replace the curved ones, when flat glass is to be tempered.

The oven 103 is moved on oven rollers 104 from its position in-line with heated bending section 107 to the flat glass position where the oven 103 is in-line with quench section 107, blow-up transfer and cooling section 113, and cooling section 117. Flat glass sheet travel is continuous, in one direction, and is provided by rollers.

Figure 12:
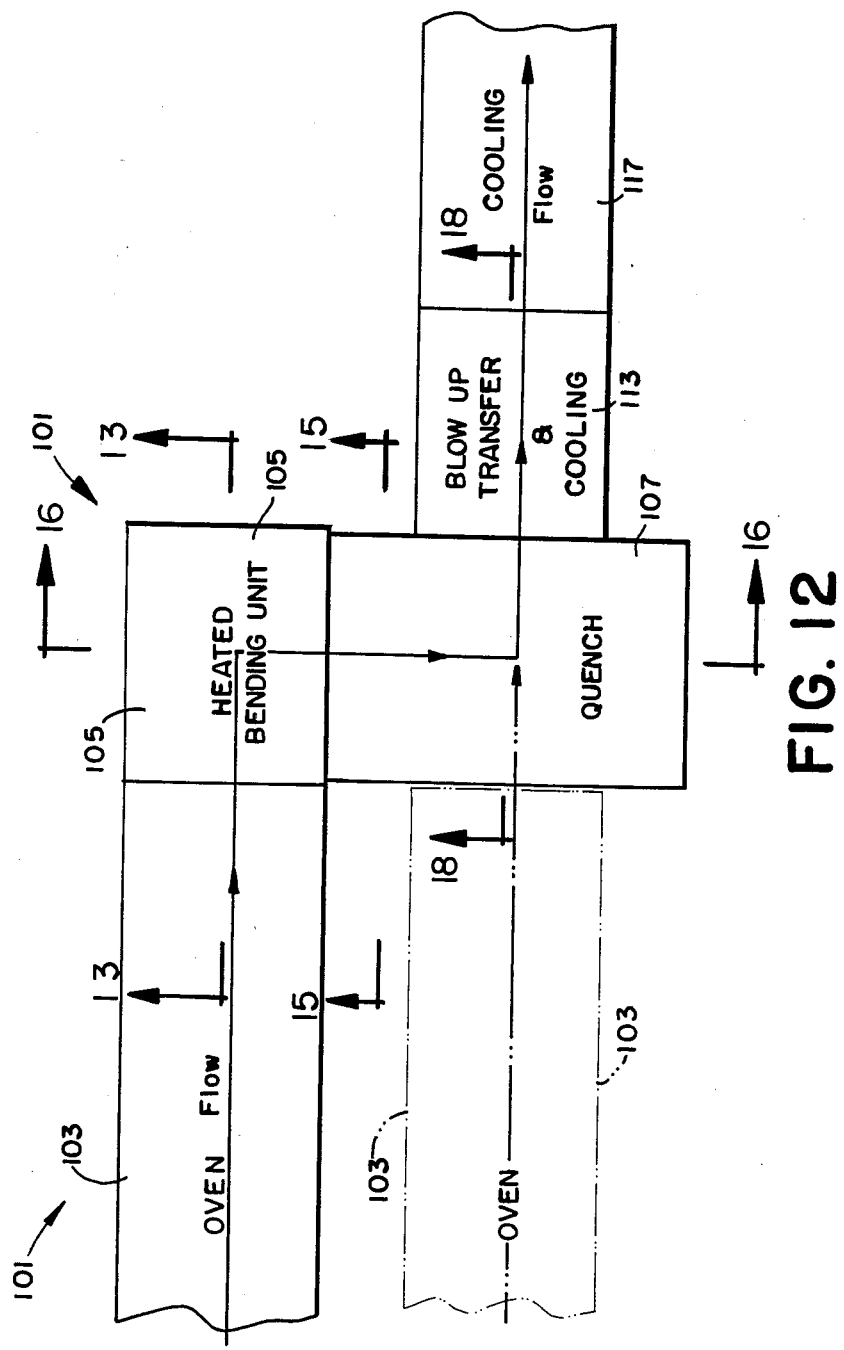
FIG. 12 is a top plan view of the general arrangement of a second embodiment of the invention.

For flat glass operation, curved upper quench head 109 and lower quench head 111 are replaced (FIG. 22) by flat quench heads 211, 213. Flat-faced upper and lower quench heads 211, 213 are used so that minimal and uniform distances are achieved between the quench air jet openings and the glass sheet 114 surfaces. Note that the flat glass sheet 114 enters the quench station 107 from a direction at right angles to the direction in which bent glass enters as shown in FIG. 12. Therefore, for reasons of uniform quenching, quench air channels 215 for flat glass sheets are at right angles to those for longitudinally bent glass sheets.

Conveying means such as conveying rolls 217 are positioned in quench section 107 to provide a means for conveying the flat glass sheet through quench section 107, whereas for bent glass quenching, blow-up shuttle 173 provides the means for transferring the bent glass sheet from quench section 107 to blow-up transfer and cooling section 113.

Not being used in flat glass sheet tempering, the blow-up shuttle 173 is stored in the cooled-down bending section 105 which also is not used in the flat glass tempering operation and the glass catcher bars 175 are removed from shuttle frame 181.

The removal of glass catcher bars 175 allows cooling head 117 of blow-up transfer and cooling section 113 to be lowered by the lifting mechanism 219 to a position that is closer to rollers 207 (FIG. 22) for most efficient cooling of the flat tempered glass sheets.

Similarly, in cooling section 119 upper cooling duct 121 is lowered by lifting mechanism 221 to a position close to rollers 207 for more efficient cooling of flat tempered glass sheets as they move through cooling section 119. Lifting mechanisms 219 and 221 are mounted on structural support frame 183.

Figure 13:
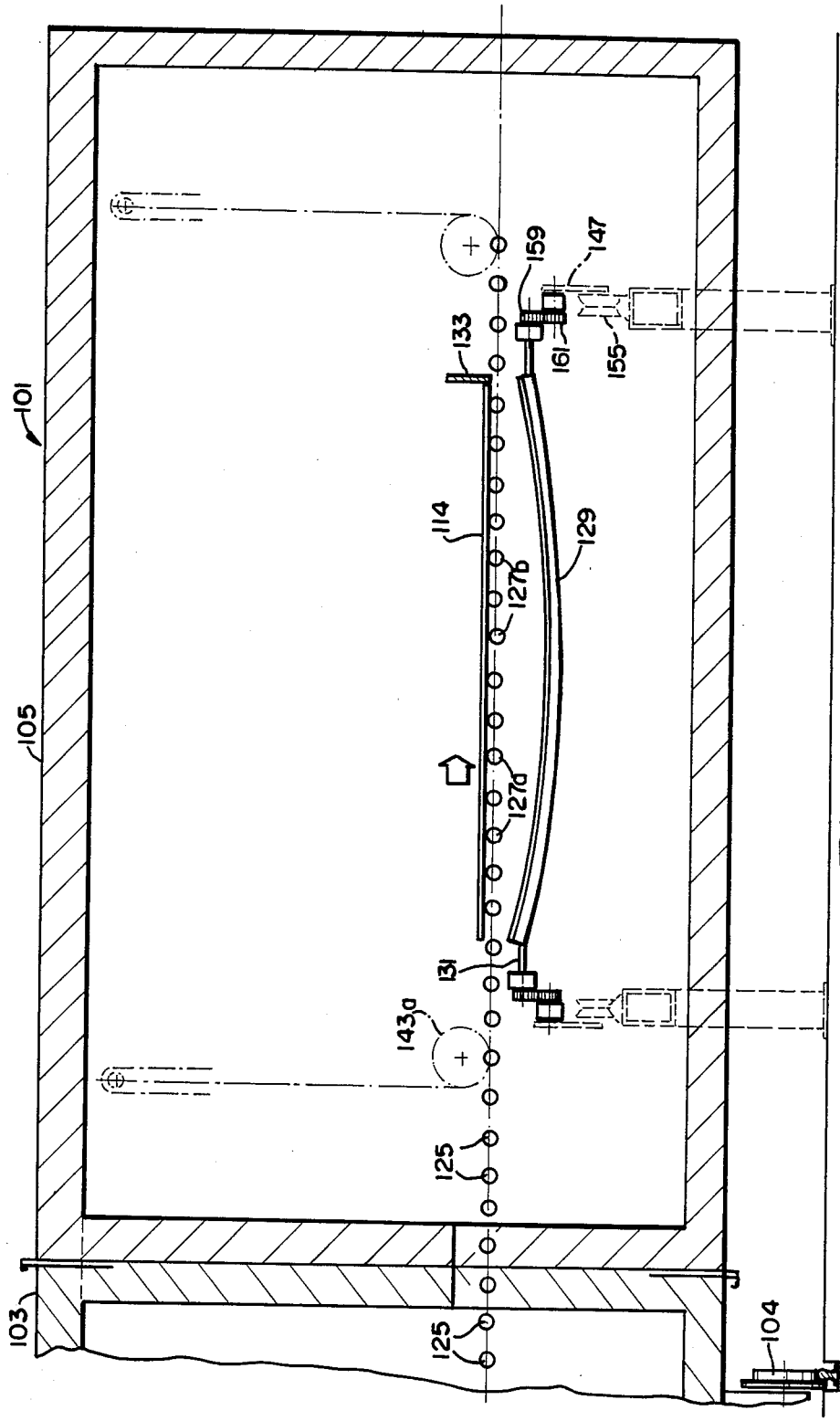
FIG. 13 is a view in section of a bending unit taken as indicated by the lines and arrows 13—13 which appear in FIG. 12.
Figure 14:
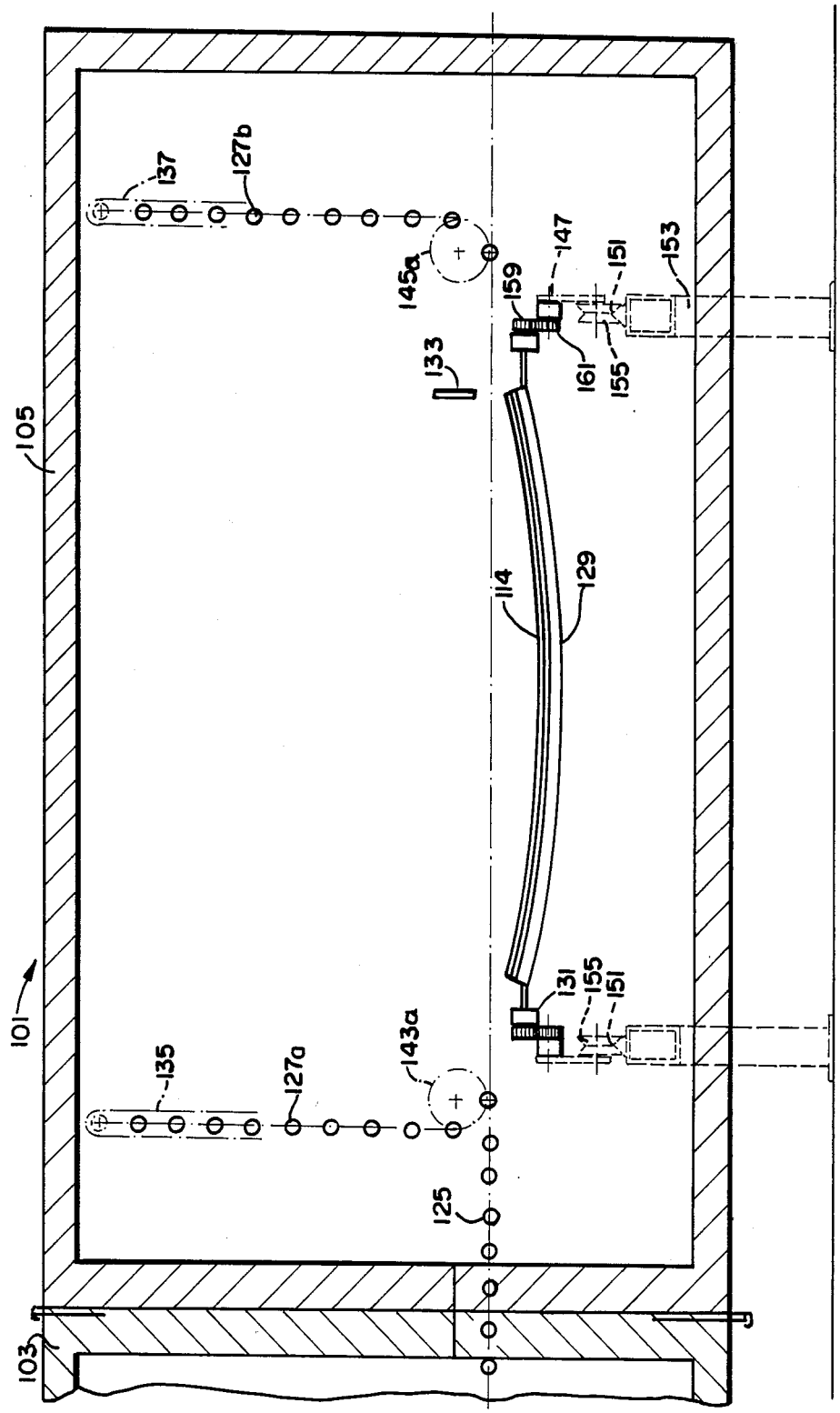
FIG. 14 is a view in section of the heated bending section similar to FIG. 13 but at a later stage of the operation.

In the glass bending operation of embodiment of FIGS. 12 to 21, a sheet of glass 114 is heated in oven section 103 and conveyed on rollers 125 into heated bending section 105 (FIG. 13). In heated bending section 105, the glass sheet 114 continues its travel on pull-out rollers 127 until it contacts stop 133 which stops the travel of the glass sheet 114 when the glass sheet 114 is centered above bending mold 129.

Pull-out transfer chains 135, 137 are activated by spur gears 139, 141 which pull apart pull-out rollers 127a, 127b and retract them quickly away from the parting line between spur gears 139, 141 (FIG. 14) so that the glass sheet 114 falls onto the bending mold 129 and sag-bends by gravity, and the plastic state of the heated glass, to fit the bending mold 129.

The bending mold 129 is supported on lift frame 131 which is in its raised position when the hot glass sheet 114 is dropped onto bending mold 129. After the glass sheet 114 has sagged into conformity with the bending mold 129, lift frame 131 is lowered into its travel position on transfer shuttle 147 (FIG. 15) so that it may travel through opening 149 out of bending section 105 into quench section 107.

The pull-out transfer chains 135, 137 are again activated by spur gears 139, 141, and they return the pull-out rollers 127 to their original closed position, ready to receive another heated glass sheet. The transfer suttle 147 that supports lift frame 131 and bending mold 129 and the glass sheet is moved along shuttle rails 151 through opening 149 of heated bending section 105 and into quench section 107. When transfer shuttle 147 is positioned between upper quench head 109 and lower quench head 111, quenching air provided by quench blower 163 (FIG. 26A) is blown through upper quench head 109 and lower quench head 111 (FIG. 17) onto the upper and lower surfaces of the sheet to quench the hot glass sheet 114. The transfer shuttle 147 and the glass sheet 114 are oscillated transversely while between the quench heads 109, 111 for optimum cooling and tempering of the glass sheet 114. When the hot glass sheet 114 has been sufficiently quenched and tempered, upper quench head 109 is raised (FIG. 19)to expose the glass catcher bars 175 of blow-up shuttle 173.

A damper 203 (FIG. 26A) pivotally mounted in upper air inlet 165 of upper quench head 109 is closed, which directs the full amount of air provided by quench blower 163 through lower air inlet 169 and through lower quench head 111 (FIG. 19). The air pressure differential between upper quench head 109 and lower quench head 111 forces upwardly the bent glass sheet 114 from transfer shuttle 147 up against glass catcher bars 175 of blow-up shuttle 173.

Blow-up shuttle 173 moves along blow-up shuttle rails 179 from quench section 107 into blow-up transfer and cooling section 113 (FIG. 20), and the glass sheet 114 is held against glass catcher bars 175 as it moves into blow-up transfer and cooling section 113 by air blown through blow-up head 115. When the travel of blow-up shuttle 173 is complete, the amount of air blown through blow-up head 115 is decreased so that the glass sheet drops onto the rollers 207 of blow-up transfer and cooling section 113.

Blow-up shuttle 173 is returned to its position within the interstices of upper air channels 167 of upper quench head 109; and upper the quench head 109 is lowered to its original position.

The glass sheet 114 is transferred through transfer section 113 and cooling section 119 by rollers 207 and is cooled by cool air which blows through blow-up head 115 and cooling head 117 and upper cooling duct 121 and lower cooling duct 123.

As shown in FIG. 22, a flat glass sheet 114 is tempered in the following manner. The flat glass sheet 114 enters oven 103 when oven 103 is in its flat glass tempering position in line with sections 107, 113 and 117 (FIG. 12). The glass sheet 114 travels from oven 103 on power rollers 125 onto conveying rolls 217 of quench section 107. The glass sheet 114 is quenched between flat quench heads 211, 213 and is moved by rollers 207 through blow-up transfer and cooling section 113 and cooling section 119.

The quenched glass sheet 114 is cooled as it moves on rollers 207 by blow-up head 115, lower cooling duct 123, and the lowered upper cooling head 117 and upper cooling duct 121.

Transfer shuttle 147 (of FIG. 16) is stored in the cooled-down bending section 105 which is not used in the flat glass tempering operation, and the bolted catcher bar assembly 175 (of FIG. 18) is removed to allow cooling head 117 and upper cooling duct 121 to be lowered for most efficient cooling of the flat glass sheets.

Embodiment of FIGS. 27–40

A third embodiment of the invention is apparatus 301 shown in FIGS. 27–40. Apparatus 301 is adapted to bend a single sheet of glass, or two smaller pieces of glass, such as automotive side lites.

Apparatus 301 includes an oven 303 for heating a sheet of glass, and a heated bending section 305 which abuts the oven 303 and is in-line with the oven 303 so that the heated glass sheet is transported from the oven 303 to the heated bending section 305 without being exposed to cool air.

A quench section 307 for quenching the heated glass sheet 314 is connected in-line with the heated bending section 305, and has (FIG. 30) an upper quench head 309 and a lower quench head 311.

A blow-up section 313 is connected in-line with quench section 307 and includes (FIG. 30) a blow-up head 315, a cooling head 317, and catcher means including catcher bars 319 affixed to cooling head 317.

A cooling section 321 for cooling the bent glass sheet 314 is connected in-line with the blow-up section 313, and includes (FIG. 30) an upper cooling duct 323 and a lower cooling duct 325.

First roller means such as rollers 327 are positioned in oven 303 and heated bending section 305 for conveying the glass sheet 314 from the oven 303 into heated bending section 305.

Second roller means such as pull-out rollers 329a, 329b are positioned in heated bending section 305 for conveying the sheet of glass 314 in the heated bending section 305.

A bending mold 331 is located in the heated bending section 305 below pull-out rollers 329a, 329b and stop means such as a stop bar 335 is positioned in heated bending section 305 to stop the travel of the glass sheet 314 on pull-out rollers 329a, 329b when the glass sheet is positioned above bending mold 331. The stop means may also be an electrical control device (not shown) that stops pull-out rollers 329a, 329b from rotating when the glass sheet is positioned above the bending mold 331.

Retracting means for pulling apart the pull-out rollers 329a, 329b and located in heated bending section 305 and includes pull-out transport chains 337 and 339. The operation of the pull-out means is described in detail in the discussion of the first and second embodiments of the invention, and the rollers 329a and 329b are retracted to open a gap through which the glass sheet falls onto bending mold 331.

Figure 28:
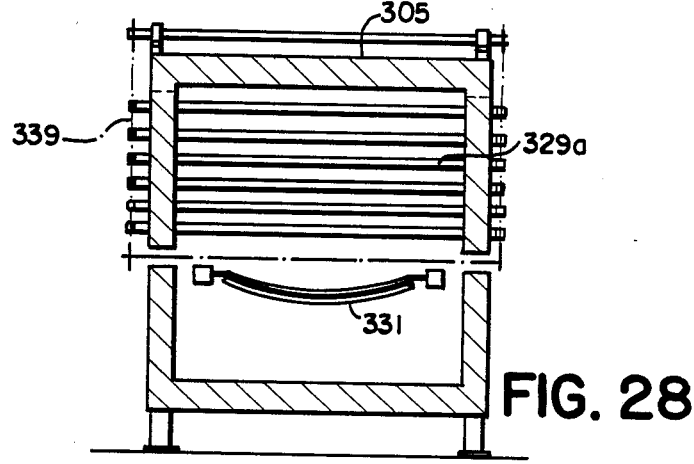
FIG. 28 is a view in section of a bending section taken as indicated by the lines and arrows 28—28 which appear in FIG. 27.
Figure 29:
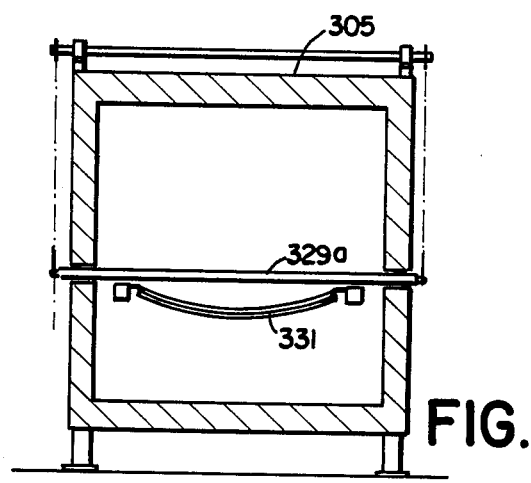
FIG. 29 is a view similar to FIG. 28 but showing a different stage of operation.

Pull-out rollers 329a, 329b are quickly retracted to form a gap through which the glass sheet 314 falls onto bending mold 331, and sags by gravity and the plastic state of the heated glass to fit the bending mold 331. In their retracted position, as shown in FIG. 28, pull-out rollers 329a, 329b move into roll travel clearance slots in the walls of the heated bending section 305. FIG. 29 shows pull-out rollers 329a, 329b after they have been returned to their normal position from their retracted position.

A shuttle 349 supports bending mold 331 in moving from bending section 305 into quench section 307. Shuttle transfer means moves shuttle 349 from a position below pull-out rollers 329a, 329b in bending section 305 through an opening 351 in the sidewall of heated bending section 305 to quench section 307. Shuttle transfer means includes shuttle rails 353 (FIG. 30) supported by shuttle rail frame 355 that extend from quench section 307 through blow-up section 313 and into cooling section 321. Shuttle wheels 357 are attached to shuttle 349 and engage shuttle rails 353 to move shuttle 349 along shuttle rails 353. A shuttle drive means (not shown) moves shuttle 349 along shuttle rails 353 and also produces an oscillating motion to oscillate horizontally the shuttle 349 while it is positioned between upper quench head 309 and lower quench head 311 of quench section 307 for optimum quenching and tempering of the glass sheet 314.

Quench section 307 includes quenching means such as quench blower 363 (FIG. 38) that blows air through upper air inlet 365 and upper air channels 367 (FIG. 30) of upper quench head 309 and lower air channels 371 of lower quench head 311. Upper quench head 309 and lower quench head 311 are curved (FIG. 31) to conform to the shape of the bent glass supported on bending mold 331.

Shuttle 349 also transfers mold 331 into blow-up section 313 which includes blowing means such as blow-up blower 373 (FIG. 39) that provides air in the blow-up head 315 for blowing the bent glass sheet up from bending mold 331 and against the catcher bars 319 affixed to the upper head 317 of the blow-up section 313. Blow-up blower 373 (FIG. 39) also provides cooling air through lower air inlet 375 to the blow-up head 315 and through upper air inlet 377 (FIG. 39) to cooling head 317 to cool the glass sheet.

The glass sheet 314 is blown against catcher bars 319 (FIGS. 32, 33) of head 317 by closing a damper 379 (FIG. 39) pivotally mounted in upper air inlet 377 so that the entire air output of blow-up blower 373 is directed through blower air inlet 375 and through blow-up head 315 (FIGS. 32, 33) to create an air pressure differential between blow-up head 315 and head 317 that forces the glass sheet 314 against the catcher bars 319 of head 317.

A shifting roller conveyor 381 (FIGS. 32-35) supported by a frame 383 is located alongside blow-up section 313 and is shifted from its position alongside blow-up section 313 in FIG. 32 to its position below the glass sheet in FIGS. 33, 34, 35 to receive the bent glass sheet from the catcher bars 319 of head 317, and move it from blow-up section 313 to cooling section 321.

The shifting conveyor 381 includes shifting means for shifting the conveyor 381 from its first position alongside the head 317 of the blow-up section 313 to its second position underneath the bent glass sheet 314 while the bent glass sheet 314 is held against the catcher bars 319 of head 317 in blow-up section 313. The shifting means includes a track 385 on which the shifting conveyor 381 moves, a shifting mechanism 387 which moves the shifting roller conveyor 381 from its first position to its second position, and a shifting actuator 389 which activates shifting mechanism 387.

Shifting roll conveyor 381 includes conveying means, such as a plurality of conveying rolls 393, that are moved under the glass sheet 314 while it is being held against catcher bars 319 by air, receive the glass sheet 314 from catcher bars 319 when the air flow releases it, and move the glass sheet 314 from blow-up section 313 to the cooling section 321.

Damper 379 (FIG. 39) in upper air inlet 377 of blow-up section 313 serves as release means for releasing the bent glass sheet 314 from the catcher bars 319 and onto the conveying rolls 393 of shifting roll conveyor 381. When it is desired to release the glass sheet from catcher bars 319, damper 379 is opened, which allows air to pass through both the upper air inlet 377 and the lower air inlet 375, thereby decreasing the air pressure differential between blow-up head 315 and head 317 and allowing the quenched bent glass sheet 314 to drop onto conveying rollers 393 (FIGS. 34, 35).

Figure 30:
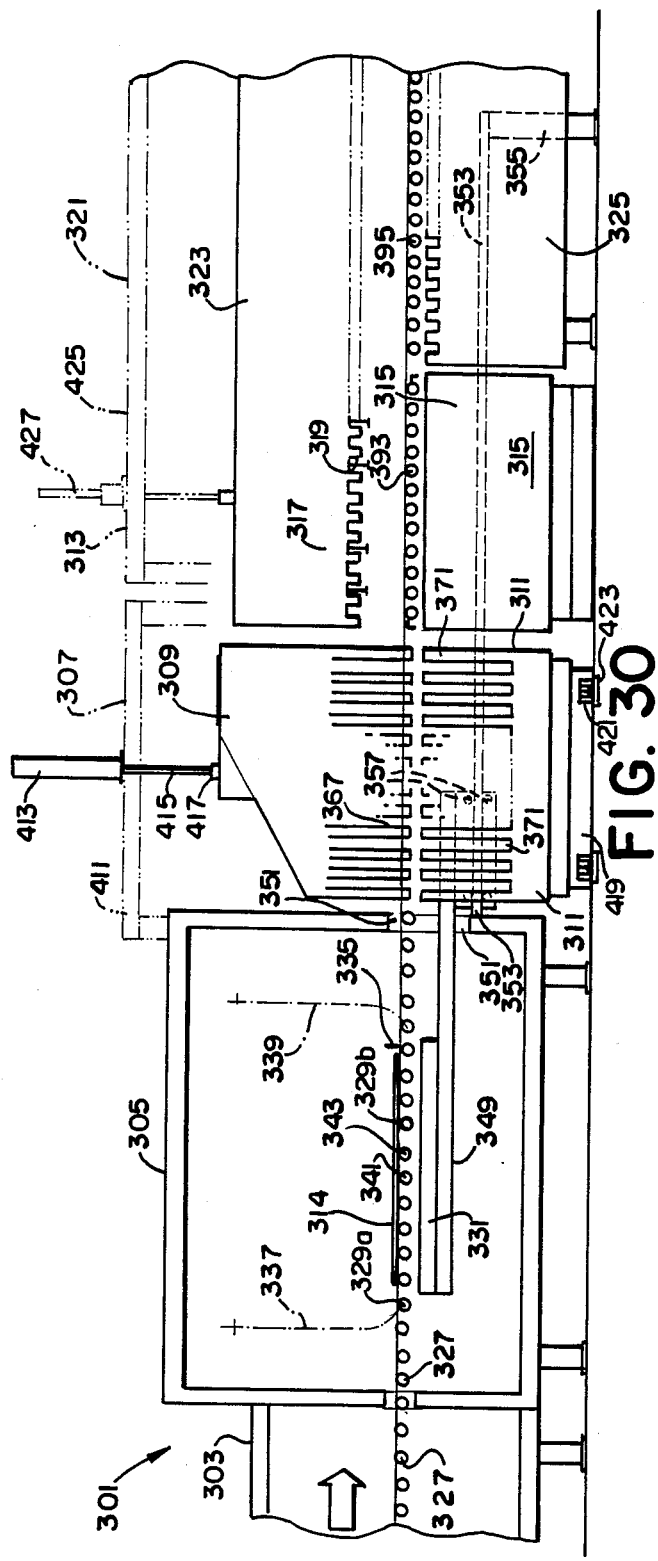
FIG. 30 is a longitudinal view in vertical section taken as indicated by the lines and arrows 30—30 which appear in FIG. 27.
Figure 31:
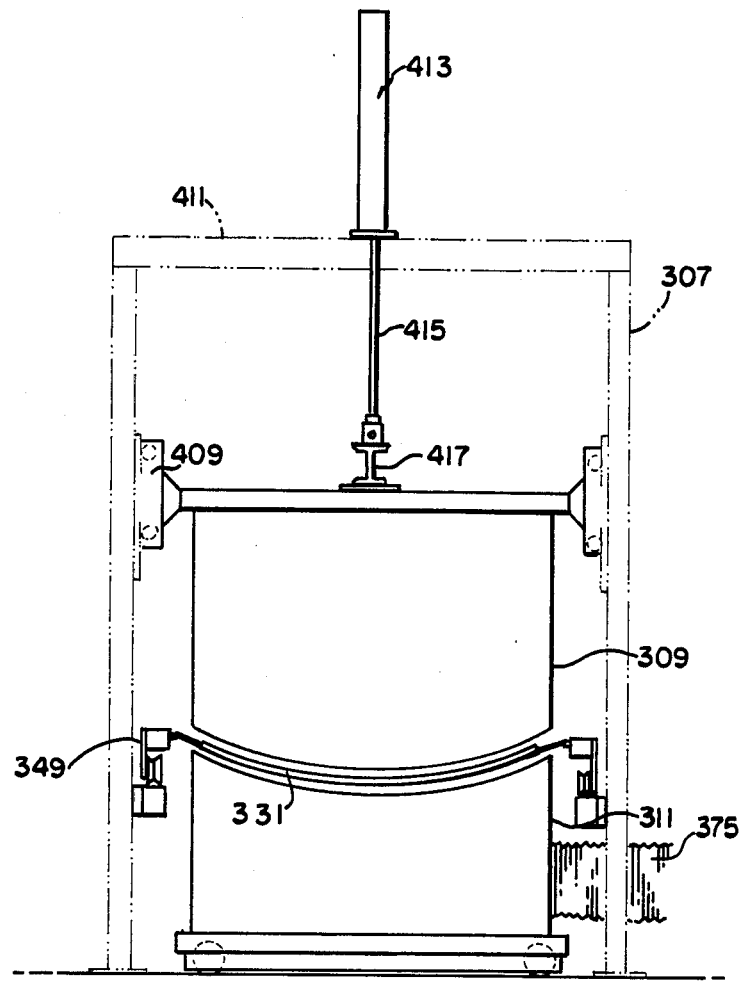
FIG. 31 is a view in vertical section of the quench section taken as indicated by the lines and arrows 31—31 which appear in FIG. 27.

The conveying rollers 393 move the glass sheet 314 from the blow-up section 313 to cooling section 321 (FIG. 30). While the glass sheet is traveling on conveying rollers 393 it is being cooled by air from blow-up head 315 and head 317 of blow-up section 313.

Conveying means, such as cooling section conveyor rollers 395 (FIG. 30) are positioned in the cooling section 321 to move the bent glass sheet from the conveying rollers 393 of the shifting roll conveyor 381 through the cooling section 321 and between the upper cooling duct 323 and lower cooling duct 325 to cool the bent glass sheet.

Cooling means such as cooling blower 397 (FIG. 40) blow air through lower air inlet 399 and upper air inlet 401 of cooling section 321 to cool the bent glass sheet.

The apparatus 301 hereinbefore described can also produce flat tempered glass, by making some equipment set-up changes along with appropriate electrical control selections and settings, as shown in FIG. 37.

The curved-face quench heads 309, 311 are replaced by (FIG. 37) upper flat quench head 403 and lower flat quench head 405. The flat-faced quench heads 403, 405 provide more effective quenching of the flat glass sheets 314. Also, removable conveying rolls 407 are positioned in quench section 307 in place of shuttle 349. In the bent glass operation of FIG. 30, shuttle 349 transfers the bent glass 314 from the heated bending section 305 to the quench section 307, but in the flat mode operation of FIG. 37, the glass 314 travels directly through heated bending section 305 without being dropped onto mold 331. Flat glass 314 is not oscillated linearly during quenching, because the glass 314 can be conveyed continuously through the operation since the combination of quench head length and glass velocity provide the necessary amount of quenching time for the glass to be properly tempered properly.

The upper quench head 309 and lower quench head 311 of FIG. 30 are easily replaced by the upper quench head 403 and lower quench head 405 of FIG. 37.

Quench section 307 (FIG. 30) includes a lift frame 409 that is connected to upper quench head 309 and moves vertically within the confines of quench main frame 411. A hydraulic lifting device 413 is supported on top of quench main frame 411 and includes a piston 415 that moves vertically upwardly and downwardly and is connected to upper quench head 309 in FIG. 30 by connecting bracket 417 to raise or lower upper quench head 309 when desired.

Lower quench head 311 rests on lift table 419 (FIG. 36), which includes wheels 421 that fit within and move along floor rails 423. The removal and replacement of the relatively large and heavy quench heads (approximate maximum of 52 inch×78 inch×36 inch high each, three and a half to four tons each) is facilitated by using the hydraulic lifting device 413 to lower the upper quench head 309 onto the lower quench head 311 and by rolling them out on floor rails 423. Lift table 419 (FIG. 30) is removed from the quench unit 307, on the operator side, to allow the removal of quench heads 309, 311.

To provide for better cooling of the glass sheets 314, structural support frame 425 (FIGS. 30, 37) of blow-up section 313 and cooling section 321 includes a lifting device 427 supported in blow-up section 313 and connected to cooling head 317 to raise and lower the cooling head 317. Cooling head 317 is lowered to be closer to the glass sheet as it travels through blow-up section 313 to provide optimum cooling. In cooling section 321, a lifting device 429 (FIG. 37) is supported on structural support frame 425 to lower upper cooling duct 323 closer to the glass sheet for optimum cooling.

In operation of the apparatus of FIG. 30, a sheet of glass 314 is conveyed through the oven 303 where it is heated, and the heated glass sheet 314 is conveyed into the heated bending section 305 where the glass sheet 314 continues to travel on pull-out rollers 329a, 329b until it contacts stop 335 which stops the travel of the glass sheet 314 over bending mold 331. Pull out rollers 329a, 329b are quickly retracted and the hot glass sheet is dropped onto bending mold 331 where it is sag-bent by gravity to conform to the shape of the mold 331.

The bent glass 314 and the bending mold 331 are transferred from the heated bending section 305 into the quench section 307 on shuttle 349. The curved glass is quickly quenched by high pressure air jets 367, 371 with air from a quench blower 363 (FIG. 38) that blows air onto the upper and lower surfaces of the glass 314. Uniform quenching over the entire glass surface is achieved by linear oscillation of the shuttle 349 during quenching. After the required time for proper quenching, the shuttle 349 transports the glass 314 and bending mold 331 into the blow-up section 313.

The quenched bent glass 314 is air-lifted (blown-up) out of the bending mold 331 with air from blow-up blower 373 (FIG. 39) that blows air through blow-up head 315 (FIGS. 30 and 32) and holds the bent glass sheet 314 against an overhead set of catcher bars 319 of upper head 317. The continuous blast of upwardly flowing air holds the glass sheet 314 against the catcher bars 319 while the shuttle 349 transports the bending mold 331 back into heated bending section 305, and shifting roller conveyor 381 (FIGS. 32-35) is moved into place below the bent glass sheet 314.

The glass sheet 314 is released by cutting off the upwardly blowing air and allowing the glass sheet 314 to fall onto the rotating rollers 393 of shifting roller conveyor 381 that convey the glass sheet into the cooling section 321. In the cooling section 321, the glass sheet 314 is moved continuously by rollers 395 through the space between vertically opposed upper cooling duct 323 and lower cooling duct 325 to cool the glass sheet 314 to acceptable handling temperatures.

Figure 36:
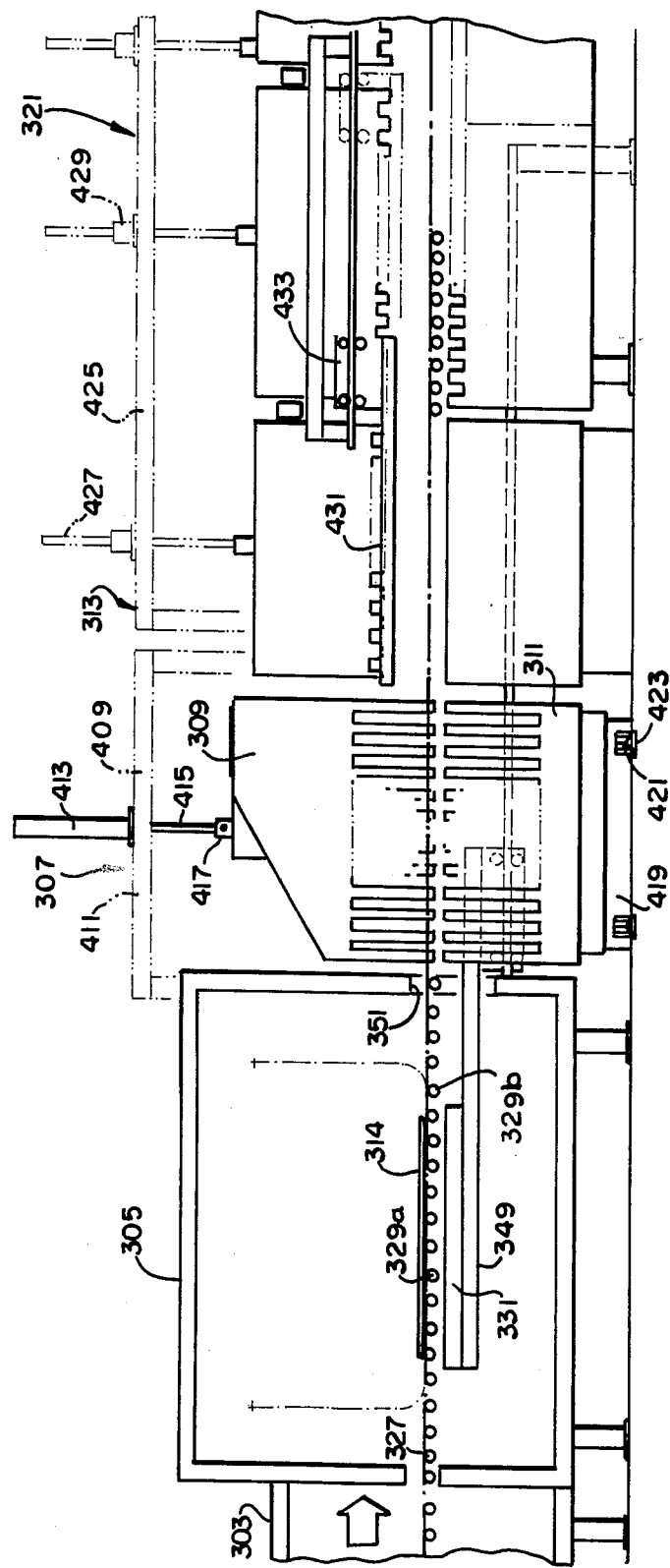
FIG. 36 is a view in section, similar to FIG. 30, of an alternative embodiment of an apparatus for moving the glass from the molds at the blow-up section for transfer to the cooling section.

FIG. 36 shows an alternative method for removing the glass sheet 314 from bending mold 331 at the blow-up section 313 for transfer to cooling section 321. The glass sheet 314 is air lifted to catcher bars 431 that are attached to a transfer shuttle 433. This requires an additional, or extended blow-up section 313 to maintain the glass sheet 314 in the lifted position during transfer to cooling section 321. This eliminates the shifting conveyor 381 of FIGS. 32-35 and the rollers in blow-up section 313.

For flat glass tempering (FIG. 37), the glass sheet 314 travel is continuous, in one direction, and is provided (FIG. 37) by rollers 327, 329a, 329b, 407, 393 and 395. The pull-out rollers 329a, 329b in bending section 305 stay in position and rotate continuously as directed by the control system. The heated bending section 305 becomes an extension of the oven 303. An insulated door 340 covers the unused opening 351 in heated bending section 305 that is needed for passage of shuttle 349. The shuttle 349 is stored, out of service, in the blow-up section 313.

Flat-faced upper quench head 403 (FIG. 37) and flat-faced lower quench head 405 are used so that minimal and uniform distance can be achieved from the quench air jet openings to the glass surfaces.

Conveying rolls 407 are manually inserted into the quench section 307 and the blow-up section 313. The bolted catcher bar assembly has been removed to allow the cooling head 317 and upper cooling duct 323 to be lowered by lifting devices 427, 429 for most efficient cooling of flat tempered glass.

The flat glass 314 is not oscillated linearly during quenching, because the combination of quench head length and glass velocity provide the necessary amount of quenching time for the glass sheet 314 to be properly tempered.

The apparatus hereinbefore described is capable of running two-up. That is, the system is able to bend, quench and cool two sheets of glass, such as the smaller automotive side lites, at a time. Two-up could be two lites moving in the flow direction, side-by-side, or two lites moving together, but one behind the other in the flow direction. When the system is running two up, the glass is bent in the transverse direction because of the side-by-side travel of the glass, the shape of the glass, and the direction of curvature of the bends in the glass.

ADVANTAGES

The three embodiments of the invention have advantages over the prior art, and the third embodiment of the invention, shown in FIGS. 27-40, has advantages over the second embodiment of the invention shown in FIGS. 12-26. The advantages of the third embodiment over the second embodiment include:

1. Oven 303 (FIG. 27) of the third embodiment remains in a fixed location, and is not moved when the mode of operation (flat or bent) is changed as is oven 103 in FIG. 12.

2. The upper quench head 309 (FIG. 30) of the third embodiment is not raised and lowered in each bending cycle like the upper quench head 109 (FIGS. 18-21) of the second embodiment to allow the removal of the bent glass sheet 314 from the mold. Because oscillation of the glass sheets 314 in the third embodiment (FIG. 30) is in the same direction as travel of the glass sheet 314 to the blow-up unit 313, the mold 331 and glass sheet 314 simply pass through the curved space between the faces of the quench heads 309, 311 to the blow-up section 313 where the glass sheet 314 is removed from the mold 331.

3. The bending and quench shuttle 349 (FIG. 30) of the third embodiment does not require the second embodiment's (FIGS. 13-15) frame 131 which lowers the mold below the chains to permit passage of the mold out of the bending section 305. Because oven 303, heated bending section 305 and quench section 307 are all in-line, the shuttle 349 travels through heated bending section 305 in the direction of glass sheet travel.

As shown in FIG. 12, heated bending unit 105 of the second embodiment is at right angles to quench section 107 and shuttle 147 travels between them. Since the travel of mold 129 and shuttle 147 is perpendicular to the orientation of pull-out chains 135,137, mold 129 must be lowered by frame 131 into shuttle 147 so the mold 129 does not contact chains 135, 137 when shuttle 147 is moved out of heating bending unit 105.

4. The third embodiment provides improved accessibility to all sections of the system for easier maintenance and operating inspections because of the in-line arrangement of the sections 303, 305, 307, 313, and 321.

We claim:

1. Apparatus for bending glass sheets by drop forming, comprising
a forming station,
bending mold means in the forming station for bending the glass sheet,
forming station roller means in the forming station for moving the glass sheet in the forming station,
roller rotating means for rotating the forming station roller means,
means for retracting the forming station roller means from beneath the glass sheet to open a gap and drop the glass sheet onto the bending mold means for sag bending the glass sheet to conform to the shape of the mold means,
and means for quenching the bent glass sheet in the mold means.

2. The apparatus of claim 1, including
a cooling section next to the quenching means,
cooling means in the cooling section for cooling the bent glass sheet so that it can be handled,
and means for moving the bent glass sheet from the quenching means through the cooling section.

3. The apparatus of claim 1, including
an oven section next to the forming station for heating the sheet of glass to a hot, softened condition.

4. The apparatus of claim 1, including
means for stopping the glass sheet at a desired position in the forming station over the bending mold means.

5. The apparatus of claim 1, including
means for lifting the quenched glass sheet from the mold means and elevating it above the level of forming station roller means,
means for closing the gap in the forming station roller means by moving the forming station roller means from retracted to closed position,
and means for dropping the quenched glass sheet onto the forming station roller means for further transport.

6. The apparatus of claim 1 wherein the quenching means includes
upper and lower quench heads between which the hot glass sheet is positioned during quenching,
means for blowing air from the quench heads onto the surfaces of the glass sheet to quench it,
means for elevating the upper quench head after quench to a position above the level of the forming station roller means,
air means for blowing the quenched glass sheet against the bottom of the upper quench head to hold the glass sheet above the forming station roller means,
and means for dropping the quenched glass sheet from the upper quench head onto the forming station roller means for further transport.

7. The apparatus as claimed in claim 1, wherein
the roller rotating means including a roll rotation chain attached to the forming station rollers,
said roll rotation chain, when powered to move, causing the forming station roller means to rotate and transport the hot softened glass sheet into the forming station, and
said roll rotation chain, when stopped, causing the forming station roller means to rotate towards the center of the forming station while the forming station roller means are being pulled apart quickly by the retracting means, so that no sliding and no marking occurs on the underside of the glass sheet as the glass sheet is dropped from the forming station roller means onto the bending mold means.

8. The apparatus as claimed in claim 1 wherein
the retracting means includes pull-out roll transport chains attached to the forming station rollers for pulling the forming station rollers apart quickly from underneath the glass sheet.

9. The apparatus of claim 1, including
means for oscillating the bending mold means while quenching the glass sheet.

10. The apparatus as claimed in claim 5, wherein
the gap closing means includes pull-out roll transport chains attached to the forming station roller means.

11. The apparatus of claim 1, wherein
the quenching means is located in the forming station.

12. Apparatus for bending glass sheets by drop forming, comprising
a forming station for receiving a hot softened glass sheet from an oven,
bending mold means in the forming station for bending the glass sheet,
forming station roller means in the forming station for moving the glass sheet in the forming station,
roller rotating means for rotating the forming station roller means,
means for retracting the forming station roller means from beneath the glass sheet to open a gap and drop the glass sheet onto the bending mold means for sag bending the glass sheet to conform to the shape of the mold means,
means for quenching the bent glass sheet in the mold means,
a cooling section next to the quenching means,
cooling means in the cooling section for cooling the bent glass sheet so that it can be handled,
means for moving the bent glass sheet from the quenching means through the cooling section,
an oven section next to the forming station for heating the sheet of glass to a hot, softened condition,
means for stopping the glass sheet at a desired position in the forming station over the bending mold means,
means for lifting the quenched glass sheet from the mold means and elevating it above the level of forming station roller means,
means for closing the gap in the forming station roller means by moving the forming station roller means from retracted to closed position,
means for dropping the quenched glass sheet onto the forming station roller means for further transport, the quenching means including upper and lower quench heads between which the hot glass sheet is positioned during quenching, means for blowing air from the quench heads onto the surfaces of the glass sheet to quench it, means for elevating the upper quench head after quench to a position above the level of the forming station roller means, air means for blowing the quenched glass sheet against the bottom of the upper quench head to hold the glass sheet above the forming station roller means, means for dropping the quenched glass sheet from the upper quench head onto the forming station roller means for further transport, the roller rotating means including a roll rotation chain attached to the forming station rollers, said roll rotation chain, when powered to move, causing the forming station roller means to rotate and transport the hot softened glass sheet into the forming station, and said roll rotation chain, when stopped, causing the forming station roller means to rotate towards the center of the forming station while the forming station roller means are being pulled apart quickly by the retracting means, so that no sliding and no marking occurs on the underside of the glass sheet as the glass sheet is dropped from the forming station roller means onto the bending mold means, the retracting means including pull-out roll transport chains attached to the forming station rollers for pulling the forming station rollers apart quickly from underneath the glass sheet, means for oscillating the bending mold means while quenching the glass sheet, the gap closing means including pull-out roll transport chains attached to the forming station roller means, and the quenching means being located in the forming station.

13. A method for bending glass sheets by drop forming, which comprises, heating a sheet of glass in an oven, transferring the heated sheet of glass to a forming station, moving the glass sheet in the forming station on forming station rollers, stopping the travel of the glass sheet at a desired position in the forming station over a bending mold, retracting the forming station rollers from beneath the glass sheet and dropping the glass sheet onto the mold, allowing the hot glass sheet to sag into a desired bent shape on the mold, lowering an upper quench head and quenching the bent glass sheet between upper and lower quench heads by blowing air against upper and lower surfaces of the glass sheet, oscillating the bending mold horizontally while quenching the glass sheet, lifting the glass sheet off the bending mold and holding it against the upper quench head by air, elevating the glass sheet above the level of the forming station rollers by raising the upper quench head so that the glass sheet moves upwardly with the upward force of the air holding it against the upper quench head, returning the forming station rollers from their retracted position to their closed position beneath the glass sheet, depositing the glass sheet onto the forming station rollers, and transporting the glass sheet out of the forming station to a cooling station.

14. The method of claim 13, wherein the glass sheet is lifted off the bending mold and held against the upper quench head by creating a controlled air pressure differential between the upper quench head and the lower quench head.

15. Apparatus for bending glass sheets by drop forming, comprising a bending section for receiving a hot softened sheet of glass from an oven, a bending mold in the bending section for receiving and bending the glass sheet, bending station roller means in the bending section for moving the glass sheet in the bending section, means for retracting the bending section roller means from beneath the glass sheet to open a gap and drop the glass sheet onto the bending mold to sag bend the glass sheet to conform to the shape of the mold, a quench section next to the bending section for quenching the bent glass sheet, a first shuttle which supports the bending mold and is provided with means for travel between the bending section and the quench section, quenching means in the quench section for quenching the glass sheet, a blow-up section next to the quench section at right angles to the bending section, a cooling section next to the quench section for cooling the quenched glass sheet so it may be handled, glass sheet lifting means in the quenching section for lifting the quenched glass sheet from the mold, a second shuttle at right angles to the first shuttle for receiving the lifted quenched glass sheet, means for moving the second shuttle and quenched glass sheet from the quench section to the blow-up section, transport means in the blow-up and cooling sections below the glass sheet for transporting the bent glass sheet, and means for releasing the bent quenched glass sheet from the second shuttle and depositing it on the transport means below it.

16. The apparatus of claim 15, including means for stopping the travel of the glass sheet in a position over the mold in the bending station.

17. The apparatus of claim 15, including an oven section next to the bending section for heating the sheet of glass to a hot, softened condition.

18. The apparatus of claim 15, including means for oscillating the glass sheet in the quench section.

19. The apparatus of claim 15, including mold lifting means operatively connected to the first shuttle for supporting the bending mold just below the level of the bending station roller means when the glass sheet is being bent and for supporting the mold in a lower position when moving the mold and glass sheet out of the bending section.

20. The apparatus of claim 15, wherein the quenching means includes upper and lower quench heads having a plurality of wafer-like channels and spaces between channels to achieve a pattern of high density air jets and to allow spent air to escape horizontally through the ends of spaces between channels.

21. The apparatus as claimed in claim 15, wherein said glass sheet lifting means includes a damper pivotally mounted in an air inlet to an upper quench head that controls the air pressure differential between the upper quench head and a lower quench head to hold the glass sheet against the upper quench head.

22. The apparatus of claim 15, wherein the second shuttle moving means includes glass sheet holding means for holding the glass sheet against the second shuttle in the blow-up section and includes a blow-up blower that blows air through a blow-up head to hold the glass sheet against the second shuttle.

23. Apparatus for bending glass sheets by drop forming, comprising
   a bending section for receiving a hot softened sheet of glass from an oven,
   a bending mold in the bending section for receiving and bending the glass sheet,
   bending station roller means in the bending section for moving the glass sheet in the bending section,
   means for retracting the bending section roller means from beneath the glass sheet to open a gap and drop the glass sheet onto the bending mold to sag bend the glass sheet to conform to the shape of the mold,
   a quench section next to the bending section for quenching the bent glass sheet,
   a first shuttle which supports the bending mold and is provided with means for travel between the bending section and the quench section,
   quenching means in the quench section for quenching the glass sheet,
   a blow-up section next to the quench section at right angles to the bending section,
   a cooling section next to the quench section for cooling the quenched glass sheet so it may be handled,
   glass sheet lifting means in the quenching section for lifting the quenched glass sheet from the mold,
   a second shuttle at right angles to the first shuttle for receiving the lifted quenched glass sheet,
   means for moving the second shuttle and quenched glass sheet from the quench section to the blow-up section,
   transport means in the blow-up and cooling sections below the glass sheet for transporting the bent glass sheet,
   means for releasing the bent quenched glass sheet from the second shuttle and depositing it on the transport means below it,
   means for stopping the travel of the glass sheet in a position over the mold in the bending station,
   an oven section next to the bending section for heating the sheet of glass to a hot, softened condition,
   means for oscillating the glass sheet in the quench section,
   mold lifting means operatively connected to the first shuttle for supporting the bending mold just below the level of the bending station roller means when the glass sheet is being bent and for supporting the mold in a lower position when moving the mold and glass sheet out of the bending section,
   the quenching means including upper and lower plurality of wafer-like channels and spaces between channels to achieve a pattern of high density air jets and to allow spent air to escape horizontally through the ends of spaces between channels,
   said glass sheet lifting means including a damper pivotally mounted in an air inlet to an upper quench head that controls the air pressure differential between the upper quench head and a lower quench head to hold the glass sheet against the upper quench head,
   and the second shuttle moving means including glass sheet holding means for holding the glass sheet against the second shuttle in the blow-up section including a blow-up blower that blows air through a blow-up head to hold the glass sheet against the second shuttle.

24. A method for bending glass sheets which comprises,
   heating a sheet of glass in an oven,
   transferring the heated glass sheet into a bending section,
   moving the glass sheet in the bending section on bending section rollers,
   stopping the travel of the glass sheet on the rollers when the glass sheet is centered above a bending mold,
   retracting the rollers in the bending section from beneath the glass sheet and dropping the sheet of glass flatly onto the bending mold and allowing the glass sheet to sag bend to fit the bending mold,
   transferring the heated bent glass sheet and the bending mold on a first shuttle from the bending section to a quenching section,
   quenching the heated bent glass sheet with air in the quench section,
   lifting the bent glass sheet from the mold by blowing air from below against the bent glass sheet to hold the quenched bent glass sheet against a second shuttle,
   moving the second shuttle and the quenched bent glass sheet into a blow-up section,
   maintaining a net upward air force against the bottom of the glass sheet in the blow-up section to hold the glass sheet against the second shuttle during the transfer to the blow-up section,
   decreasing the net upward air force on the quenced bent sheet to lower the quenched bent glass sheet onto conveyor rollers,
   moving the quenched bent glass sheet through the blow-up section and cooling section on the conveyor rollers,
   and cooling the bent glass sheet with air in the cooling section.

25. The method of claim 24, including oscillating the glass sheet in the quench section.

26. The method of claim 24, wherein the glass sheet is lifted off the bending mold and held against the second shuttle by creating a controlled air differential between the second shuttle and the bottom of the quenched glass sheet.

27. Apparatus for bending glass sheets by drop forming, comprising
   a bending section for receiving a hot softened sheet of glass from an oven,
   a bending mold in the bending section for receiving and bending the glass sheet,
   bending section roller means in the bending section for moving the glass sheet in the bending section,
   means for retracting the bending section roller means from beneath the glass sheet to open a gap and drop the glass sheet onto the bending mold to sag bend the glass sheet to conform to the shape of the mold, a quench section next to the bending section, means in the quench section for quenching the bent glass sheet, a blow-up section next to the quench section, blow-up means in the blow-up section for blowing air against the bottom of the quenched glass sheet for lifting the quenched glass sheet from the mold and holding the glass sheet against an upper cooling head, a shuttle which supports the bending mold and is provided with means for travel through the bending, quench, and blow-up sections, shifting roller conveyor means for shifting a roller conveyor beneath the quenched glass sheet as it is held against the upper cooling head in the blow-up section, release means for releasing the quenched bent glass sheet from the upper cooling head onto the shifting roller means which conveys the glass sheet to the cooling section, and cooling means in the cooling section for cooling the quenched glass sheet.

28. The apparatus of claim 27, including
an oven section next to the bending section for heating the sheet of glass to a hot, softened condition.

29. The apparatus of claim 27, wherein
the blow-up means includes
a blow-up blower that provides air to a lower blow-up head and an upper cooling head in the blow-up section,
and a damper pivotally mounted in the upper air inlet of the cooling head that controls the air pressure differential between the upper cooling head and the lower blow-up head so that when the damper is closed, the blow-up air is forced through the blow-up head and blows the glass sheet against the upper head.

30. The apparatus of claim 27, wherein
the release means includes a damper pivotally mounted in an upper air inlet of the blow-up section that controls the air pressure differential between the lower blow-up head and the upper head and allows the glass sheet to drop onto the shifting roller conveyor.

31. Apparatus for bending glass sheets by drop forming, comprising
a bending section for receiving a hot softened sheet of glass from an oven,
a bending mold in the bending section for receiving and bending the glass sheet,
bending section roller means in the bending section for moving the glass sheet in the bending section,
means for retracting the bending section roller means from beneath the glass sheet to open a gap and drop the glass sheet onto the bending mold to sag bend the glass sheet to conform to the shape of the mold,
a quench section next to the bending section,
means in the quench section for quenching the bent glass sheet,
a blow-up section next to the quench section, blow-up means in the blow-up section for blowing air against the bottom of the quenched glass sheet for lifting the quenched glass sheet from the mold and holding the glass sheet against a first shuttle,
a second shuttle which supports the bending mold and is provided with means for travel through the bending, quench, and blow-up sections,
a cooling section next to the blow-up section for cooling the quenched glass sheet so that it may be handled,
means for moving the first shuttle from the blow-up section to the cooling section,
transport means in the cooling section below the glass sheet for transporting the bent glass sheet,
release means for releasing the quenched bent glass sheet from the first shuttle onto the cooling section transport means which conveys the glass sheet through the cooling section,
and cooling means in the cooling section for cooling the quenched glass sheet.

32. A method for bending glass sheets which comprises,
heating a sheet of glass in an oven,
transferring the heated glass sheet into a bending section,
moving the glass sheet in the bending section on bending section rollers,
stopping the travel of the glass sheet on the rollers when the glass sheet is centered above a bending mold,
retracting the rollers in the bending section from beneath the glass sheet, and dropping the sheet of glass flatly onto the bending mold and allowing the glass sheet to sag bend to fit the bending mold,
transferring the heated bent glass sheet and the bending mold on a shuttle from the bending section to a quenching section,
quenching the heated bent glass sheet with air in the quench section,
transferring the quenched bent glass sheet and the bending mold on the shuttle from the quenching section to the blow-up section for removal of the glass sheet from the bending mold,
lifting the bent glass sheet from the bending mold by blowing air against the bottom of the glass sheet in the blow-up section to elevate the quenched bent glass sheet into contact with a cooling head,
shifting a shifting roll conveyor from a stand-by position adjacent to the blow-up section to a working position below the bent glass sheet on the cooling head in the blow-up section,
releasing the bent glass sheet from the cooling head onto the shifting roll conveyor by decreasing the net upward air force on the bottom of the quenched glass sheet,
moving the bent glass sheet on the rollers of the shifting roller conveyor to the cooling section,
moving the quenched bent glass sheet through the cooling section,
and cooling the bent glass sheet with air as the glass sheet moves through the cooling section.

* * * * *